(12) United States Patent
Wieder et al.

(10) Patent No.: US 6,312,628 B1
(45) Date of Patent: Nov. 6, 2001

(54) MOLD TEMPERATURE CONTROL

(75) Inventors: Horst K. Wieder; Martin Wieder; Peter Strupp, all of Watertown, WI (US)

(73) Assignee: CITO Products, Inc., Watertown, WI (US)

( * ) Notice: Subject to any disclaimer, the term of this patent is extended or adjusted under 35 U.S.C. 154(b) by 0 days.

(21) Appl. No.: 09/221,544

(22) Filed: Dec. 28, 1998

(51) Int. Cl.$^7$ ................................................. B29C 45/73
(52) U.S. Cl. ............................... 264/37.27; 264/328.16
(58) Field of Search ........................... 264/37.27, 40.6, 264/328.14, 328.16

(56) References Cited

U.S. PATENT DOCUMENTS

| | | | |
|---|---|---|---|
| 2,535,436 | * 12/1950 | Maynard | 264/328.16 |
| 3,259,175 | * 7/1966 | Kraus et al. | |
| 4,246,214 | * 1/1981 | Osswald et al. | |
| 4,354,812 | 10/1982 | Wieder et al. | |
| 4,420,446 | 12/1983 | Wieder et al. | |
| 4,548,773 | * 10/1985 | Suh et al. | 264/328.16 |
| 4,553,583 | * 11/1985 | Perrella et al. | |
| 4,623,497 | * 11/1986 | Waters | 264/328.16 |
| 5,026,512 | * 6/1991 | Chang | 264/40.6 |
| 5,376,317 | * 12/1994 | Maus et al. | 264/40.6 |
| 5,427,720 | 6/1995 | Kotzab | |
| 5,589,114 | 12/1996 | Evans | |
| 5,591,385 | * 1/1997 | Arai et al. | 264/40.6 |
| 5,772,933 | 6/1998 | Kotzab | |
| 5,792,392 | * 8/1998 | Maus et al. | 264/40.5 |

OTHER PUBLICATIONS

CITO Products, Inc., Cooling Manual, CM–120–3.
CITO Products, Inc., Mold Surface Temperature Control for Highest Quality Production and Shortest Molding Cycle, DD–120–2.
CITO Products, Inc., Pulse Cooling with Moldmonitor Process Controller, MMPC–I–A–1.
CITO Products, Inc., Flow Products, FP–B–36–A–1.

* cited by examiner

Primary Examiner—Jill L. Heitbrink
(74) Attorney, Agent, or Firm—Foley & Lardner

(57) ABSTRACT

A method and system for controlling the temperature of a fluid cooled high temperature injection mold having fluid channels formed therein. A high temperature injection mold has an operating temperature above the boiling point of water. A flow of either elevated pressure or low pressure cooling water is passed through the fluid channels in the high temperature injection mold for a limited duration during the molding cycle to thereby reduce the temperature of the injection mold to a desired level. Elevated pressure cooling water is elevated to a pressure level such that the cooling water will remain in a liquid state while passing through the fluid channels. Low pressure cooling water is at a pressure level such that the cooling water enters the fluid channels in a liquid state and transitions to a vapor state within the fluid channels. The cooling water may be provided to the high temperature injection mold in a closed loop system, wherein cooling water which is treated to remove contaminants therefrom is stored in a cooling water supply tank. Used high temperature cooling water emerging from the fluid channels of the high temperature injection mold is preferably mixed with lower temperature cooling water from the cooling water supply tank before being returned to the cooling water supply tank. Elevated or low pressure cooling water may be passed through some fluid channels in an injection mold while high temperature heating water is passed simultaneously through other fluid channels in the same mold.

18 Claims, 9 Drawing Sheets

MOLD TEMPERATURE CONTROL

FIELD OF THE INVENTION

The present invention pertains generally to injection molds for casting thermoplastics, aluminum die casting, and the like, and, more particularly, to a method and device for controlling the temperature of such a mold during high temperature molding processes.

BACKGROUND OF THE INVENTION

Injection molding is a well-known process which may be used for the fabrication of complexly shaped plastic or metal objects or parts. In the injection molding process, a molten thermoplastic or metal material, such as aluminum, is introduced into a mold and allowed to set or cure by cooling. Once the plastic or metal is set or cured, the mold is opened, and the molded object is released. The temperature of the injection mold is preferably controlled so that the mold is at the proper temperature when the molten material is injected into the mold and such that the object formed in the mold is set or cured at an optimal rate to both maintain the quality of the molded object while minimizing the setting or curing time to maximize production rates.

Generally, an injection mold is cooler than the molten material which is injected into it. Thus, as hot molten material is injected into a mold, the mold absorbs heat from the molten material. This heat must be removed from the mold, and, therefore, from the molten material, before the molten material will set or cure. As a series of objects are molded successively in a mold, the temperature of the mold will tend to increase toward the temperature of the molten material being injected into the mold.

It is generally desirable to maintain the temperature of an injection mold at a level which allows a plastic or metal object being molded to exhibit the least possible amount of shrinkage and distortion during the setting or curing process. It is also important to maintain the mold at a consistent operating temperature so as to ensure uniformity among replications of the object being molded. It is also desirable to remove excess heat from the mold promptly after the molding of an object so as to more quickly prepare the mold for the subsequent introduction of a molten material. Increased production efficiency can be achieved if the mold temperature is quickly brought down to the desired operating temperature between individual object molding cycles.

Temperature control of an injection mold is typically accomplished by circulating cooling fluid through channels fashioned in the walls of the mold. Conventionally, the cooling fluid is heated to a desired ideal operating temperature for cooling the mold and then is circulated through the mold before the first injection or "shot" of hot plastic or metal material is introduced into the mold. The temperature of the mold initially increases upon the introduction of the hot molten material, but is restored to the desired operating temperature by the continuous circulation of the cooling fluid, the temperature of which is maintained at the ideal operating temperature. In order to maintain the desired mold operating temperature, the cooling fluid may be circulated through the mold substantially all the time that the mold is being used to make successive replications of the object being molded.

Methods and devices for controlling the temperature of a fluid-cooled injection mold without the need for a continuous flow of cooling fluid are described in U.S. Pat. Nos. 4,354,812 and 4,420,446 to Horst K. Wieder, et al. These patents describe methods by which an injection mold can be maintained at a desired operating temperature using a cooling fluid which need not be elevated to or maintained at an ideal operating temperature. Accurate control of the temperature of an injection mold can be achieved by mounting a temperature sensor onto or within the mold. The temperature sensor provides an output signal indicative of the mold temperature. If the sensed mold temperature exceeds a selected control temperature level, a valve is opened to allow cooling fluid to enter the cooling channels in the mold, to thereby cool the mold. When the temperature sensor indicates that the mold is cooled below the control temperature, the valve is closed. Since cooling fluid is not continuously pumped through the mold cooling channels, the cooling fluid need not be heated to a particular operating temperature and the consumption of cooling fluid is reduced.

Another method of injection mold temperature control is described in U.S. Pat. No. 5,427,720 to Kotzab. Typically, a plurality of cooling channels are formed in an injection mold to provide cooling fluid to the mold. This patent describes determining, empirically or by calculation, a selected distribution profile for distributing cooling fluid among the cooling channels to achieve the desired amount of cooling of the injection mold. Depending upon the shape of the object being molded, certain portions of the injection mold may require more cooling than others. At the same time during each molding cycle, a temperature sensor signal is used to determine the temperature deviation of the mold from a desired temperature. Simultaneously, valves are opened to provide pulses of cooling fluid through the cooling channels in the pre-determined distribution profile. The duration of the cooling pulses is determined by the measured temperature deviation.

For some applications, the "pulse" cooling injection mold temperature control schemes just described may employ ordinary tap water as the cooling fluid. However, for many molding operations, the operating temperature of an injection mold is very high. For example, the operating temperature of an injection mold for a high temperature molding process may be 300° F. or higher, and the molten material injected into the mold may typically be at 700° F. or higher. It has been believed that ordinary tap water cannot be used as the cooling fluid for such high temperature molding operations. It has been thought that water would instantly turn to steam upon entering the cooling fluid channels of the high temperature injection mold, and thus could not effectively reduce the mold temperature.

Petroleum-based oils or mineral heat transfer fluids are typically employed as cooling fluids for controlling the mold temperature of high temperature injection molding operations. The use of such materials for high temperature injection mold cooling has several important limitations, however. Such fluids have an inherently poor heat transfer rate. Thus, the time needed during a production cycle to bring the injection mold to the desired operating temperature using such fluids is relatively long, thereby increasing the cycle duration, and decreasing the production rate. Furthermore, petroleum based oils are difficult to work with and potentially dangerous. The combination of petroleum-based oil and high temperatures presents a fire hazard. The use of oil-based cooling fluids can also adversely affect the quality of a molded object. Hydrocarbon molecules from the cooling oil can get into the mold itself. These molecules will leave contamination deposits on the molded plastic or metal object. These contamination deposits can adversely affect the quality and appearance of the molded object. In particular, contamination deposits on an aluminum injection molded or die cast object, caused by oil based cooling fluid contamination, will prevent finishing of the aluminum object, such as high surface gloss finishing or metal-like chrome metalization, in the affected area. If the aluminum object cannot be finished properly, it must typically be scrapped.

SUMMARY OF THE INVENTION

In accordance with the present invention, water is used as a cooling fluid for controlling the temperature of a high temperature injection mold. It has been found that a high temperature injection mold can be cooled effectively using either low or elevated water pressure water as a cooling fluid. In accordance with the present invention, either low or elevated pressure water is injected through cooling channels in an injection mold to cool the mold efficiently and at an optimal rate to thereby assure that a molded object is properly set to achieve a high quality part, while minimizing the cooling time in order to maximize the production rate.

The present invention may be employed in any type of high temperature injection molding application, e.g., for forming plastic or metal objects. Since water is used for mold temperature control, the potential fire hazard associated with using petroleum based oils for high temperature mold cooling is avoided. Water will not contaminate or damage a molded object, as can oil-based cooling fluids. Also, water has a better heat transfer rate than petroleum based or mineral oil heat transfer fluids. Thus, the present invention provides efficient high temperature mold cooling for the production of high quality molded objects at a high production rate.

A high temperature injection mold includes one or more mold parts. Each mold part has a surface formed thereon which forms part of the mold surface. When the mold parts are brought together, the mold surfaces define the shape of a plastic or metal object to be formed by the injection molding process. Heaters, such as electric heaters, are placed within and/or around the mold parts. The heaters are controlled by a process controller to bring the mold temperature up to a high temperature molding level, e.g., approximately 300° F. or higher. A molten material, such as thermo plastic or metal, is injected into the mold, between the mold surfaces, when the mold is heated to the desired temperature. The injected molten material may be, for example, molten thermo plastic material which is injected into the mold at approximately 700° F. or higher. The injection of the high temperature molten material into the mold causes the mold temperature to rise rapidly. In accordance with the present invention, cooling fluid channels are formed through the parts of the injection mold. The cooling fluid channels are preferably formed in the injection mold at positions relative to the heaters and the mold surfaces to provide optimally efficient heat removal from the mold.

In accordance with the present invention, elevated pressure water may be employed as a cooling fluid for controlling the temperature of a high temperature injection mold. At elevated pressure levels, cooling water will remain in the liquid state throughout the cooling process. This is because the boiling point of water increases with the pressure level under which the water is maintained.

In accordance with the present invention, low pressure cooling water may be used to control the temperature of a high temperature injection mold. Low pressure cooling water is initially pumped into the injection mold cooling channels in the liquid state. However, since the temperature of the injection mold is significantly above the boiling point of the low pressure water, the water will quickly boil out of the mold. In passing through the latent heat phase, from the liquid state to the vapor state, the low pressure water removes a large amount of heat from the mold. Thus, the use of low pressure water as a cooling fluid provides for a large amount of heat removal with a minimum of cooling fluid used.

In accordance with the present invention, either elevated or low pressure water is injected into the cooling channels of a high temperature injection mold to provide high temperature mold cooling. Cooling fluid control valves are opened to admit the elevated or low pressure water into the cooling channels formed in the injection mold at the proper time and for a sufficient duration to provide the desired amount of cooling. Various different techniques may be used to control the opening and closing of the cooling fluid control valves. For example, a temperature sensor may be mounted in or on the injection mold. A temperature or process controller may be designed or programmed to monitor the mold temperature via the temperature sensor and to control the opening and closing of the cooling fluid control valves to admit elevated or low pressure water into the cooling channels of the injection mold to provide the desired amount of cooling based on the monitored mold temperature. Alternatively, the cooling fluid control valves may be opened at a selected time and for a selected duration during each molding cycle to provide a pre-set cooling pulse of low or elevated pressure water into the injection mold. The amount of elevated or low pressure water flowing through the cooling channels in the injection mold may be monitored, e.g., using a rotary turbine flow sensor, and the cooling fluid control valves closed when a desired amount of elevated or low pressure water has been admitted through the cooling channels. More than one cooling fluid control valve may be employed to control the flow of elevated or low pressure water through cooling channels formed in different positions within the mold. Such cooling fluid control valves may be controlled independently to provide optimized cooling water pulses to different parts of the mold to assure product quality and maximize production rates.

High temperature injection mold cooling employing either elevated or low pressure water in accordance with the present invention may be implemented in either a closed or open loop cooling system. In an open loop cooling system in accordance with the present invention, water for cooling a high temperature injection mold is provided directly from an external water supply, such as a plant's cooling system. The external water supply is connected either directly to the cooling fluid control valves for controlling the flow of cooling water into the injection mold (for low pressure water cooling) or to the control valves via a pressurization system for increasing the water pressure to an elevated level (for elevated pressure water cooling in accordance with the present invention, where the available external supply of water is not at an elevated pressure level). In an open loop cooling system, high temperature elevated pressure water or steam emerging from the injection mold cooling channels is mixed with low temperature water from the external water supply, to bring the high temperature used cooling water to a lower pressure and temperature level, before being returned to the plant cooling system water supply or drained.

In a closed loop high temperature injection mold cooling system in accordance with the present invention, all of the cooling water used in the cooling process is stored in a cooling water supply tank. The stored cooling water is preferably softened, distilled, or otherwise treated to remove the minerals therefrom which are typically found in water from external sources, e.g., tap water. This mineral-free cooling water is provided to the cooling fluid control valves for controlling the flow of cooling water into the high temperature injection mold. For elevated pressure water cooling, a pressurization system is positioned between the cooling water supply tank and the cooling fluid control valves to bring the cooling water to the desired pressure level before the water is admitted into the high temperature injection mold. Used cooling water, in the form of high temperature, elevated pressure water or steam coming out of the cooling channels of the high temperature injection mold, is mixed with low temperature, low pressure water from the cooling water supply tank before being returned to the cooling water supply tank. A heat exchanger may preferably be positioned in the cooling water supply tank to control the temperature of the cooling water therein to a desired temperature level. Low temperature water from an external water supply, such as general plant cooling system water, may be circulated through the heat exchanger to control the temperature of the cooling water in the cooling water supply tank to the desired level.

A closed loop cooling system allows mineral-free cooling water to be employed for high temperature mold cooling in accordance with the present invention. The use of mineral-free water prevents mineral deposits from forming in the cooling channels of the injection mold during the cooling process. Such mineral deposits can cause the cooling channels to become blocked over time. Moreover, even minimal mineral deposits in the cooling channels can adversely affect the cooling process. The calculations programmed into the process controller for controlling the amount and distribution of cooling water flowing in the cooling channels in the injection mold are made assuming fully unobstructed cooling channels in the injection mold. The use of a closed loop cooling system in accordance with the present invention is particularly critical where low pressure cooling water is used for mold cooling in accordance with the present invention. Since the low pressure cooling water will vaporize in the cooling channels of the injection mold, mineral deposits will quickly build up and block the cooling channels if conventional tap water is employed as the cooling fluid, such as in an open loop system.

In either a closed or open loop high temperature mold cooling system in accordance with the present invention, a pressurized mixing valve is preferably used as a cooling water return manifold to mix the used high temperature cooling water or steam emerging from the cooling channels of the high temperature injection mold with low pressure low temperature water to reduce the temperature and pressure of the used cooling water before the cooling water is returned to the cooling water supply tank, plant cooling system, or drain. The pressurized mixing valve preferably includes a mixing chamber. High temperature water or steam from the injection mold cooling channels is admitted into the mixing chamber through one or more input ports in the valve. A source of low temperature water, such as from the plant cooling system or the cooling water supply tank, is connected to a low temperature water input port of the mixing valve. As the used high temperature cooling water admitted into the mixing chamber causes the temperature in the mixing chamber to rise, cold water is admitted from the low temperature water input port into the mixing chamber where it is mixed with the high temperature water or steam from the mold cooling channels to reduce both the temperature and pressure thereof. The flow of low temperature water into the mixing chamber may be controlled by a wax expansion cartridge extending into the mixing chamber. The expansion cartridge expands as the temperature in the mixing chamber rises when high temperature cooling water or steam from the injection mold cooling channels is admitted thereto. The expanding cartridge pushes on a plunger which, in turn, displaces a check ball for blocking the flow of low temperature water into to the mixing valve, thereby allowing low temperature water to be admitted into the mixing chamber past the check ball. Mixed high temperature and low temperature water from the mixing chamber, which is now reduced in both temperature and pressure level, is released from the mixing valve through an output port thereof. Cooling water from the mixing valve is returned to the cooling water supply tank, plant cooling system, or drain. The flow of cooling water through the mixing valve output port is preferably controlled by a back pressure valve which may be pressure adjustable. A pressure relief valve is preferably also connected in fluid communication with the mixing chamber of the pressurized mixing valve. The pressure relief valve is preferably set to open at a relatively high pressure level, to thereby open the mixing chamber of the pressurized mixing valve should the back pressure valve at the output port of the pressurized mixing valve fail causing the pressure in the pressurized mixing valve to rise to a high level which may damage the valve or be dangerous.

Cooling water from a single cooling water supply tank may be used to provide simultaneous closed loop high temperature injection mold cooling, using either low pressure or elevated pressure cooling water in accordance with the present invention, for multiple high temperature injection molds. Treated, e.g., demineralized, cooling water from the cooling water supply tank may be provided to cooling fluid control valves associated with each high temperature injection mold to be cooled. Each such injection mold may have different numbers of cooling fluid control valves associated therewith, which may be controlled independently by a single or multiple process controllers. The process controller or controllers may implement different control and cooling processes for each such injection mold. High temperature used cooling water or steam emerging from each high temperature injection mold is provided to a return manifold, wherein the high temperature water or steam is mixed with low temperature cooling water from the cooling water supply tank before being returned to the tank. The return manifold may be implemented using a pressurized mixing valve as described previously. Multiple return manifolds may be connected in series such that cooling water from the cooling water supply tank flows through each manifold in turn, mixing with the used hot water or steam from multiple injection molds as it flows. The mixed cooling water, having a now reduced temperature and pressure level, may then be returned to the cooling water supply tank through a single port therein.

Injection mold cooling using elevated or low pressure cooling water in accordance with the present invention may be combined with heating water heating of an injection mold to provide a complete mold temperature control system and method. A supply of heating water, e.g., from a heating water supply tank, may be connected to the injection mold fluid control valves in parallel with the low or elevated pressure cooling water supply, from either a cooling water supply tank (closed loop system) or a plant cooling water supply (open loop system). The heating water from the heating water supply may be heated to a desired operating temperature using, for example, a heating element placed in the heating water supply tank. A valve system connected between the heating and cooling water supplies and the fluid control valves may be controlled by a process controller to provide either heating or cooling water to the fluid control valves. The fluid control valves may, therefore, be controlled to provide high temperature heating water or low temperature cooling water through the fluid channels formed in the injection mold.

The valve system employed between the heating and cooling water supplies and the fluid control valves may be configured such that a flow of cooling or heating water to different molds or different portions of the same mold may be independently controlled. Heating water may be provided to all of the injection mold fluid control valves. The fluid control valves may then be opened to provide a flow of heating water through the channels formed in the mold to raise the mold to a desired operating temperature. This mode of operation may be employed, for example, to bring the injection mold to a desired operating temperature before a molding material is injected into the mold. After a high temperature molding material is injected into the mold, the temperature of the mold will rise rapidly. Cooling of the injection mold is achieved by removing the supply of heating water from the fluid control valves, and connecting the supply of cooling water to the fluid control valves. As described previously, either elevated pressure or low pressure cooling water may be provided to the fluid control valves. The fluid control valves are then controlled to provide a flow of cooling water through the injection mold fluid channels to reduce the temperature of the injection mold.

As described previously, various methods may be used to control the flow of cooling water through the fluid channels. For example, a steady flow of cooling water may be provided until the sensed temperature of the injection mold is reduced to a desired level, or a specific volume and/or duration of cooling water flow may be provided at a specific point in time during the injection molding cycle. Preferably, the fluid control valves are operated to provide pulses of cooling water through the fluid channels in the injection mold to reduce the injection mold temperature to the desired level. The duty cycle of the cooling water pulses may be controlled based on the monitored temperature of the injection mold. Larger duty cycles may be employed where the monitored injection mold temperature exceeds the desired injection mold temperature by a greater amount.

Depending upon the injection mold configuration and the injection molding processes employed, some sections of the injection mold may require heating, while other portions of the injection mold require cooling during some portion of the injection molding cycle. For example, a stationary cover portion of an injection mold may require heating while a movable ejector portion of the injection mold requires cooling, or vice versa. In accordance with the present invention, a supply of heating water may be provided to the fluid control valves for controlling the flow of fluid through the channels of one portion of an injection mold, while a supply of cooling water is provided to the fluid control valves for controlling the flow of fluid through the fluid channels in another portion of the same injection mold. The fluid control valves may be independently controlled to provide a flow of cooling water, e.g., cooling water pulses, through the channels formed in one portion of the injection mold, to lower the temperature of certain portions of the mold, while other fluid control valves are controlled to provide a flow of heating water through other channels formed in other portions of the injection mold, to increase simultaneously the temperature of such other portions of the injection mold.

High temperature injection mold cooling and heating using elevated or low pressure water in accordance with the present invention provides many advantages over previous methods of controlling the temperature of high temperature injection molds. Water is a much safer cooling medium than the petroleum based or other oils previously used for high temperature injection mold cooling. By using water as a cooling fluid, the dangers of a hot oil fire hazard are eliminated. Moreover, water provides a better heat transfer rate than petroleum based or mineral oil heat transfer fluids, thereby providing more rapid injection mold cooling, and, therefore, increased production rates. Furthermore, the use of water as a cooling fluid eliminates the potential for damage to the injection molded object by oil particles leaking into the mold itself. Such contamination can reduce the quality of the injection molded object, and may even require that the object be scrapped. The use of low pressure water for high temperature injection mold cooling in accordance with the present invention is particularly advantageous in that the low pressure water is a highly efficient cooling medium. The heat removal capacity of water is enhanced by the water passing through the latent heat phase from the liquid to vapor state during the cooling process.

Other objects, features, and advantages of the invention will be apparent from the following detailed description taken in conjunction with the accompanying drawings.

DETAILED DESCRIPTION OF THE INVENTION

In accordance with the present invention, water is employed as a cooling fluid for controlling the temperature of a high temperature injection molding process. For purposes of the present invention, a high temperature injection molding process is an injection molding process which takes place at a temperature level above the boiling point of water at normal atmospheric pressure levels. Typically, and for example, the lowest operating temperature of an injection mold for a high temperature injection molding process may be 300° F. or higher, with molten material injected into the mold typically at a much higher temperature, e.g., 700° F. or higher. The present invention may be employed for the temperature control of any high temperature injection molding process, including injection molding processes for forming plastic (e.g., thermoplastic or thermo set) or metal (e.g., aluminum) objects of any shape, size, or character.

Figure 1:
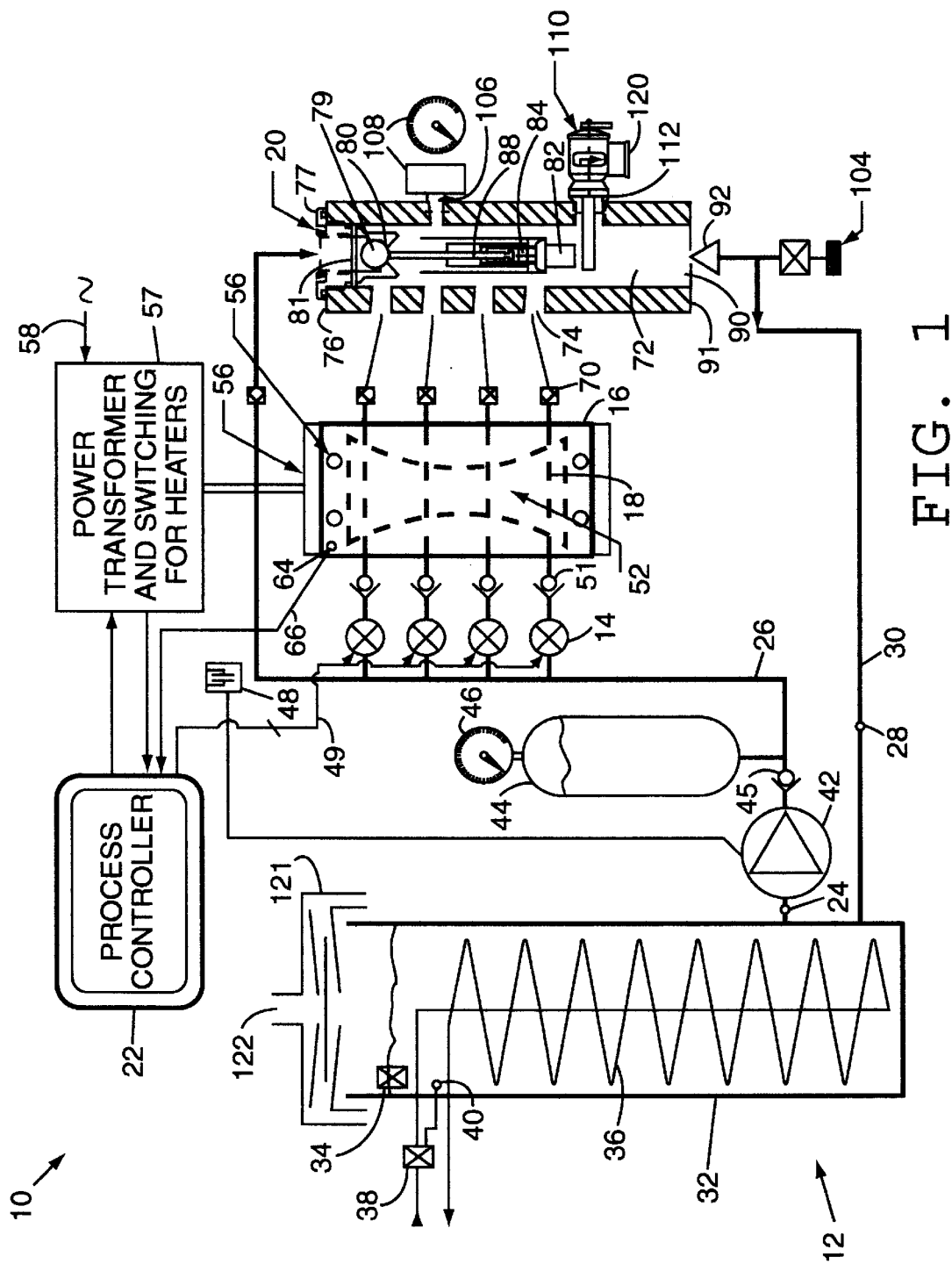
FIG. 1 is a schematic illustration of an exemplary high temperature injection mold cooling system in accordance with the present invention.

An exemplary high temperature injection mold cooling system in accordance with the present invention is illustrated schematically at 10 in FIG. 1. Major components of a high temperature injection mold cooling system 10 in accordance with the present invention include: a source of cooling water 12, one or more cooling fluid control valves 14 for controlling the flow of cooling water from the cooling water source 12 into an injection mold 16, the injection mold 16 itself, having cooling fluid channels 18 formed therein to allow the flow of cooling water therethrough, a return manifold, which may be implemented as a pressurized mixing valve 20, and a process controller 22. In the pressurized mixing valve 20, high temperature used cooling water or steam from the high temperature injection mold 16 is mixed with cold water from the cooling water source 12 before being returned to the water source 12 or drained. The process controller 22 controls the cooling fluid control valves 14, and other system components, to thereby control the temperature of the high temperature injection mold 16. Each of these components of a high temperature injection mold cooling system in accordance with the present invention will now be described in further detail.

In accordance with the present invention, water is employed as a cooling fluid for a high temperature injection mold. The cooling water used as the cooling medium is provided from a cooling water source 12. The cooling water source 12 is connected at a point 24 to a supply line 26 which provides the cooling water to cooling fluid control valves 14 which, in turn, are operated to control the flow of cooling water into the high temperature injection mold 16.

A high temperature injection mold cooling system 10 in accordance with the present invention may be implemented as either a closed loop or open loop system. In an open loop system, cooling water is provided to the high temperature injection mold 16 from a cooling water source 12 external to the high temperature injection mold cooling system 10 itself. For example, for an open loop system, the high temperature injection mold cooling system 10 may be connected directly to an external water supply, such as a plant's general cooling system, e.g., at input point 24 on cooling water supply line 26. In such a case, used cooling water, which has passed through the high temperature injection mold 16, may be returned to the plant's general cooling system, at a point 28 via a cooling water return line 30, or, alternatively, may be drained.

Since cooling water for a high temperature injection mold cooling system in accordance with the present invention can be provided from existing water supplies, an open loop high temperature injection mold cooling system in accordance with the present invention is more conveniently and economically implemented than the closed loop system to be described below. However, the long term costs of operating an open loop system can be much higher than those incurred for operating a closed loop system. Typically, water from an external water supply, such as a plant's general cooling system, will contain minerals and other contaminants. As the cooling water is passed through the cooling channels 18 in the high temperature injection mold 16, these minerals and other contaminants will be deposited and accumulate on the walls of the cooling channels 18. As these minerals and other contaminants continue to build up, the cooling channels 18 will become restricted. The placement, size, and volume of cooling water flow through the cooling channels 18 in the injection mold 16 are designed to achieve an optimum cooling profile for the injection mold 16. As the flow of cooling water through the cooling channels 18 becomes restricted by the deposits, optimal cooling of the injection mold 16 can no longer be achieved. Over time, the cooling channels 18 may become entirely blocked by minerals or other deposits from the externally supplied cooling water. Therefore, if an open loop injection mold cooling system in accordance with the present invention is employed, the injection mold cooling channels 18 will periodically need to be cleaned of minerals and other deposits. This requires that the injection molding process itself be shut down during the cleaning period, interrupting production. As will be discussed in more detail below, in one embodiment of the present invention, low pressure cooling water injected into the cooling channels 18 of the injection mold 16 is allowed to pass from the liquid state to the vapor state in cooling channels 18. In such a case, if an open loop high temperature injection mold cooling system in accordance with the present invention is employed, mineral deposits will build up rapidly in the cooling channels 18, requiring frequent cleaning of the cooling channels 18, and, therefore, frequent shut down of the injection molding process. Therefore, if low pressure cooling water is employed in a high temperature injection mold cooling system in accordance with the present invention, a closed loop system is preferred.

An exemplary embodiment of a preferred closed loop high temperature injection mold cooling system in accordance with the present invention is illustrated in FIG. 1. In the closed loop system, cooling water for the cooling process is stored in a cooling water supply tank 32. The cooling water stored in the cooling water supply tank 32 is softened, distilled, or otherwise treated to remove the minerals and other contaminants therefrom which are typically found in water from external sources, e.g., tap water. The cooling water supply tank 32 is connected at point 24 to the cooling water supply line 26, to provide cooling water to the injection mold 16 via the cooling fluid control valves 14, and at point 28 to the cooling water return line 30, to receive used cooling water returning from the injection mold 16. Since used cooling water is returned to the cooling water supply tank 32 on the return line 30, the treated cooling water in the cooling water supply tank 32 is continually reused. Of course, over time, cooling water will escape from, be released from, or evaporate from the closed loop system 10.

A water level sensor 34, which may be implemented in a conventional manner, is preferably mounted in the cooling water supply tank 32. The water level sensor 34 is used to monitor the level of cooling water in the supply tank 32. As cooling water is lost from the closed loop system, the water level in the supply tank 32 will decrease. The water level sensor 34 may be used to monitor these losses from the closed loop system. If the water level in the supply tank 32 gets too low, as indicated by the water level sensor 34, additional treated cooling water is preferably added to the cooling water supply tank 32. This may be accomplished manually, by an operator who monitors a display of the water level provided by the water level sensor 34, and who adds treated cooling water to the supply tank 32, such as by opening a valve (not shown), when the water level is too low. Alternatively, additional treated cooling water may be added automatically to the cooling water supply tank 32 when the water level sensor 34 indicates that the water level in the cooling water supply tank is too low. For example, the water level sensor 34 may be implemented as a level switch, which automatically turns on a system for providing treated water to the cooling water supply tank 32 when the water level in the supply tank is too low, and which automatically turns off such a system when the level of cooling water in the cooling water supply tank 32 is restored. Alternatively, the water level sensor 34 may provide a water level signal to the process controller 22, which, in turn, may control a system for providing additional treated cooling water to the cooling water supply tank 32 when the water level signal provided by the water level sensor 34 indicates that the water level in the cooling water supply tank 32 is too low.

The cooling water supply tank 32 preferably also acts as a heat transfer tank. Used cooling water returned to the cooling water supply tank 32 on the return line 30 from the high temperature injection mold 16 is typically much warmer than the cooling water in the supply tank 32. The returning used cooling water will, therefore, cause the temperature of the cooling water in the cooling water supply tank 32 to rise. Preferably, cooling water in the cooling water supply tank 32 is maintained at a stable and desirable temperature level. A heat exchanger 36 placed within the cooling water supply tank 32 may preferably be used to maintain the temperature of the cooling water in the cooling water supply tank 32 at the desired steady level. The heat exchanger 36 may be of any conventional design, including, for example, a copper tube coil. Low temperature water, or another cooling fluid, is circulated through the heat exchanger 36 to cool the cooling water in the cooling water supply tank 32. A valve 38 may be used to control the flow of low temperature fluid through the heat exchanger 36. The valve 38 may, for example, be implemented as an independently operable temperature controlled valve. The valve 38 may, therefore, be connected to a temperature sensor 40 mounted within the cooling water supply tank 32. The temperature sensor 40 is used to sense the temperature of the water in the cooling water supply tank 32. When the sensed temperature of the cooling water in the cooling water supply tank 32 exceeds a desired temperature level, the valve 38 is automatically opened to circulate low temperature fluid through the heat exchanger 36 to thereby lower the temperature of the cooling water in the cooling water supply tank 32 to a desired level, at which point the valve 38 is closed. Alternatively, the valve 38 may be controlled by the process controller 22. In this case, the temperature sensor 40 mounted in the cooling water supply tank 32 may provide a signal corresponding to the sensed temperature of the water in the cooling water supply tank 32 directly to the process controller 22 which, in turn, may employ the temperature information provided by the temperature sensor 40 to control the valve 38. As another alternative, the process controller 22 may control the flow of low temperature fluid through the heat exchanger 36 based on the mold temperature cooling process employed. For example, as will be described in more detail below, the temperature of the injection mold 16 may be controlled by controlling the fluid control valves 14 to provide pulses of cooling water through the channels 18 formed in the mold 16. The duty cycle of the cooling water pulses may be increased in response to increasing mold temperatures. When the cooling pulse duty cycle exceeds a certain percentage (e.g., 50%) of the maximum duty cycle, the process controller 22 may open the heat exchanger valve 38 to allow low temperature fluid to flow through the heat exchanger 36, to thereby reduce the temperature of the cooling water in the cooling water supply tank 32 to enhance cooling of the mold.

In accordance with the present invention, a pump 42 is connected to the cooling water supply line 26 to pump cooling water from the cooling water supply tank 32 through the cooling channels 18 in the high temperature injection mold 16 via the cooling fluid control valves 14. An accumulator 44 may also be connected to the cooling water supply line 26. The accumulator 44 is employed, in combination with the pump 42, to maintain a desired cooling water pressure level within the cooling water supply line 26. A check valve 45 may be provided on the cooling water supply line 26 to prevent back-flow of pressurized water in the accumulator 44 to the pump 42. A pressure gauge 46 may be provided on the accumulator 44 to allow an operator of the system to monitor the cooling water pressure in the accumulator 44 and, therefore, within the cooling water supply line 26.

The pump 42 is preferably controlled to maintain the cooling water pressure in the cooling water supply line 26 at a desired pressure level when the cooling fluid control valves 14 are opened to allow cooling water to flow into the cooling channels 18 in the high temperature injection mold 16. The pump 42 may be controlled using a pressure switch 48 or transducer connected in fluid communication with the cooling water supply line 26, or the accumulator 44, and electrically connected to the pump 42. If the pressure in the supply line 26 drops below the desired pressure level, the pressure switch 48 will close, thereby turning on the pump 42 which, in turn, will pump cooling water from the cooling water supply tank 32 into the accumulator 44 to increase the pressure in the cooling water supply line 26 to the desired pressure level. When the desired pressure level is reached, the pressure switch 48 will open, thereby turning off the pump 42. (Of course, a degree of hysteresis is provided by the pressure switch 48.) A conventional pressure transducer 48, water pump 42, and accumulator 44 may be used to maintain the pressure in the cooling water supply line 26 at the desired level. The accumulator 44 acts to dampen the sudden pressure change caused by turning on and off the pump 42, and compensates for the lag time in changing the pressure level following pump turn on. Alternatively, a pump 42 which is capable of maintaining the desired cooling water pressure in the cooling water supply line 26 may be employed. Such a pump may be controlled by a pressure transducer 48 as illustrated in FIG. 1. Alternatively, the pump 42, with or without accumulator 44, may be controlled by the process controller 22. If the pump 42 is controlled by the process controller 22, a sensor (not shown) may be placed in the cooling water supply line 26 or in the accumulator 44 to provide a signal corresponding to the water pressure in the cooling water supply line 26 to the process controller 22.

The pressure level at which the cooling water in the cooling water supply line 26 must be maintained depends upon the particular high temperature injection mold cooling process which is implemented. As will be discussed in more detail below, a high temperature injection mold cooling process in accordance with the present invention may employ either elevated pressure or low pressure cooling water.

Elevated pressure or low pressure cooling water in the cooling water supply line 26 is provided to the cooling fluid control valves 14 which control the flow of cooling water through cooling channels 18 formed in the high temperature injection mold 16. The cooling fluid control valves 14 may be implemented as conventional electrically operated valves which are controlled by signals provided on lines 49 from the process controller 22 to control the flow of cooling water provided to the injection mold 16 in a manner to be described in more detail below. Check valves 51 may be provided between the injection mold 16 and the fluid control valves 14 to prevent cooling water back flow from the mold 16 to the fluid control valves 14.

Figure 2:
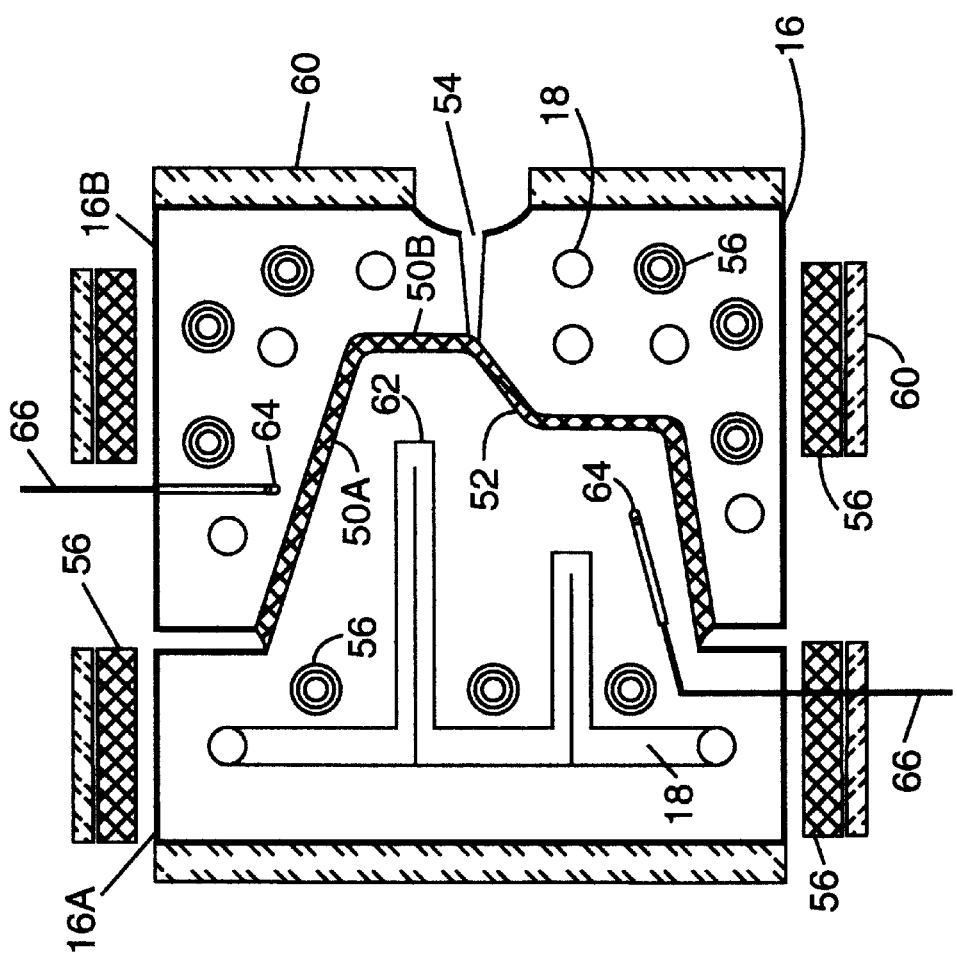
FIG. 2 is a schematic illustration, in cross section, of an exemplary high temperature injection mold, the operating temperature of which may be controlled by a high temperature injection mold cooling system in accordance with the present invention.

The present invention may be employed for controlling the temperature of any conventional high temperature injection mold having cooling channels 18 formed therein. An exemplary high temperature injection mold with which the present invention may be employed is illustrated in and will be described with reference to FIG. 2. FIG. 2 illustrates an exemplary high temperature injection mold 16 in cross section. The injection mold 16 may typically be made of a metal such as steel. The injection mold 16 is formed of one or more mold parts 16A and 16B. Each mold part 16A and 16B has a molding surface, 50A and 50B, respectively. When the mold parts 16A and 16B are brought together, the molding surfaces, 50A and 50B, form a mold cavity which defines the shape of a metal or plastic object 52 to be molded therein. A channel 54 formed in one of the mold parts 16B provides a path for injecting molten material into the injection mold 16 between the molding surfaces 50A and 50B to form the injection molded object 52.

Electric heaters 56 are preferably positioned within and/or around the injection mold 16. The electric heaters 56 are provided with power and operated by a power transformer and switching devices which form an electric heater controller 57 (see FIG. 1). A power transformer (not shown) in the electric heater controller 57 is connected to an electric power source via electric power source supply lines 58. Switching devices (not shown) in the electric heater controller 57, which connect the power transformer in the electric heater controller 57 to the electric heaters 56, are controlled by signals provided from the process controller 22. The process controller 22 thereby controls the electric heaters 56 to heat up the injection mold 16 to a desired operating temperature level. The electric heaters 56 may be implemented and controlled in a conventional manner.

Cooling fluid channels 18 are formed in the injection mold 16. In accordance with the present invention, elevated pressure or low pressure cooling water is circulated through the cooling channels 18 to lower the operating temperature of the injection mold to a desired level. Thus, the electric heaters 56 and the flow of cooling water in the cooling fluid channels 18 are controlled, in combination, to maintain the temperature of the high temperature injection mold at the desired operating temperature level. Insulating plates 60 may be placed around the injection mold 16 to minimize the effect of the ambient atmospheric temperature surrounding the injection mold 16 on the operating temperature of the mold 16.

Preferably, the cooling channels 18 are positioned in the injection mold 16 between the electric heaters 56 and the injection mold molding surfaces 50A and 50B. The relative placement of the cooling fluid channels 18 and electric heaters 56 in the parts 16A and 16B of the injection mold in this manner provides for effective heating of the mold surfaces 50A and 50B by the electric heaters 56 for efficient mold fill, and effective cooling of the mold surfaces 50A and 50B by efficient heat removal therefrom by cooling water flowing through the cooling fluid channels 18. The exact positioning of the electric heaters 56 and cooling fluid channels 18 within the injection mold 16 will depend upon the injection mold employed and the process used for controlling the flow of cooling water through the mold as well as the shape of the injection molded object 52 to be formed. As illustrated, portions 62 of the cooling fluid channels 18 preferably extend into portions of the injection mold 16 shaped for the formation of concave portions of the injection molded object 52, thereby providing effective cooling of the corresponding convex extended portions of the injection mold surface 50A. Optimal positioning of the electric heaters 56 and cooling fluid channels 18 in the injection mold 16 will be well known to those skilled in the art of injection mold design. See, e.g., U.S. Pat. No. 5,772, 933 to Werner Kotzab, the specification of which is hereby incorporated by reference.

One or more temperature sensors 64 are preferably mounted within the injection mold 16. The temperature sensors 64 are each connected, via a line 66, to the process controller 22. The temperature sensors 64, which may be implemented in a conventional manner, provide temperature signals to the process controller 22 which correspond to the temperature at various points in the injection mold 16. The optimal position of the temperature sensors 64 within the injection mold 16 relative to the electric heaters 56, the cooling fluid channels 18, and the injection mold molding surfaces 50A and 50B may be determined in accordance with conventional methods known to those skilled in the art of injection molding, such as using a computer program. Alternatively, the temperature sensors 64 may be mounted approximately one-half way between a cooling fluid channel 18 and one of the molding surfaces 50A or 50B.

In accordance with the present invention, enhanced pressure or low pressure cooling water flows through the cooling fluid channels 18 formed in the injection mold 16 to thereby cool the injection mold 16. As the cooling water flows through the cooling fluid channels 18 in the injection mold 16, the cooling water picks up heat from the injection mold 16. The used high temperature cooling water emerging from the cooling fluid channels 18 in the high temperature injection mold 16 is preferably screened, e.g., using fine mesh fluid screens 70, before being drained or, in a closed loop system in accordance with the present invention, before being returned to the cooling water supply tank 32. The fluid screens 70 prevent any molding residue or other large contaminants from being drained or returned to the cooling water supply tank 32.

The high temperature cooling water emerging from the injection mold cooling fluid channels 18, in either liquid or vapor form, is preferably cooled to a lower temperature level before being drained or returned to the cooling water supply tank 32. In accordance with the present invention, high temperature used cooling water is preferably cooled by mixing the high temperature used cooling water with low temperature cooling water, such as from the cooling water supply tank 32. The pressurized mixing valve 20 is preferably employed for this purpose. A preferred embodiment of a pressured mixing valve 20 in accordance with the present invention is illustrated in, and will be described in detail with reference to, FIG. 3.

The pressurized mixing valve 20 includes a mixing chamber 72 formed therein, wherein high temperature used cooling water is mixed with low temperature cooling water before being drained or returned to the cooling water supply tank 32. High temperature used cooling water, in liquid or vapor form, is admitted into the mixing chamber 72 of the pressurized mixing valve 20 via one or more hot water input ports 74. The hot water input ports 74 may be formed in a side wall 75 of the pressurized mixing valve 20, as illustrated. A source of low temperature cooling water, such as the cooling water supply line 26, connected either to the cooling water supply tank 32 or a plant cooling system water supply, is connected to the mixing valve 20, e.g., at one end 76 of the mixing valve 20.

Preferably, low temperature cooling water is admitted into the mixing chamber 72 only when necessary to cool used high temperature cooling water therein. A valve assembly 77 is thus preferably connected between the low temperature cooling water supply 26 at the end 76 of the mixing valve 20 and the mixing chamber 72 of the mixing valve 20. An O-ring 78 or other type of gasket or sealing mechanism may be used to create a seal between the valve assembly 77 and the mixing valve 20. The valve assembly 77 admits low temperature cooling water into the mixing chamber 72 only when necessary, eliminating the need for a constant flow of low temperature cooling water through the mixing valve 20.

Figure 3:
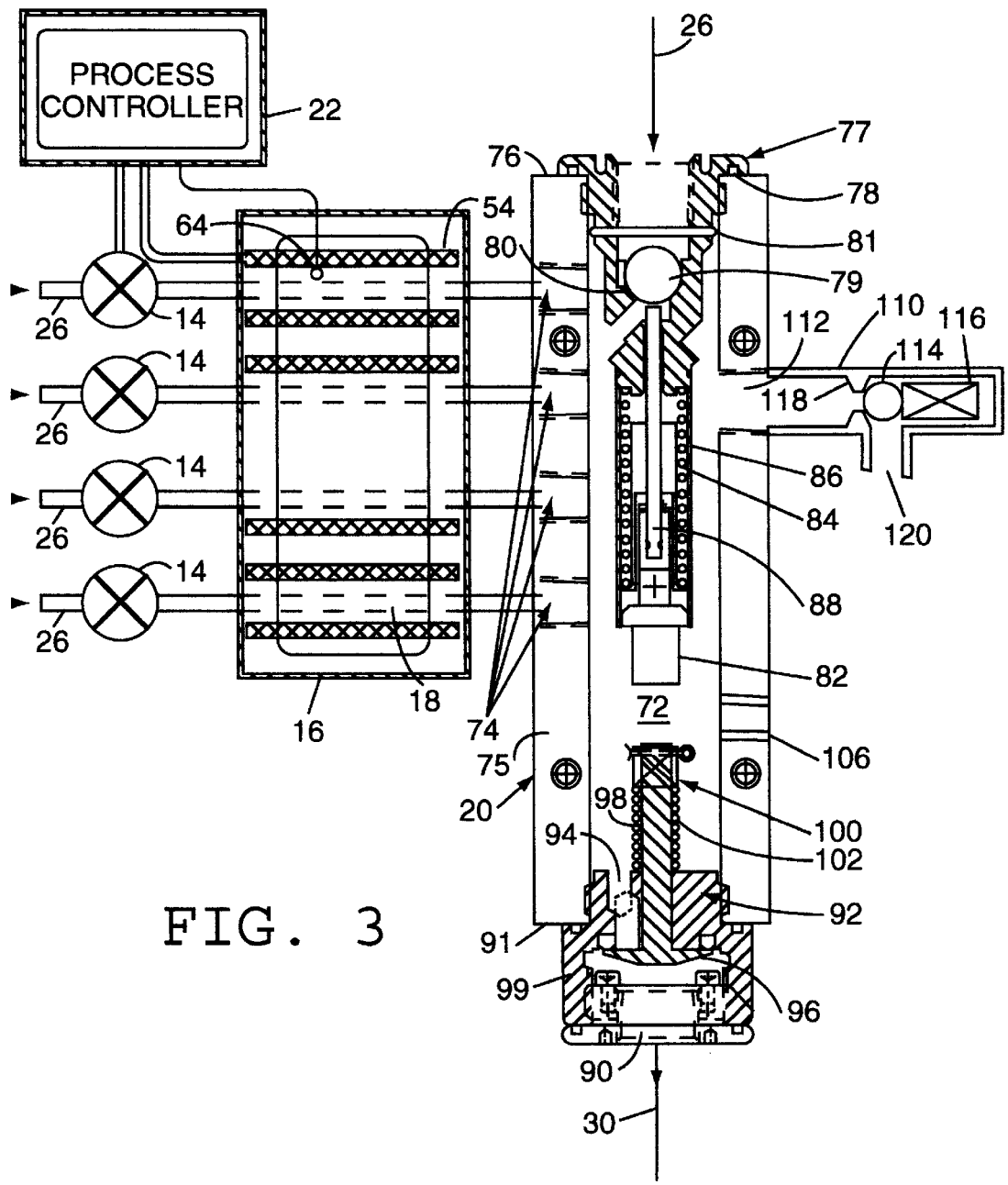
FIG. 3 is a schematic illustration, in cross section, of a preferred embodiment of a pressurized mixing valve for use in a high temperature injection mold cooling system in accordance with the present invention, shown connected to a portion of a schematically illustrated high temperature injection mold cooling system in accordance with the present invention.

An exemplary valve assembly 77 is illustrated in FIG. 3. The exemplary valve assembly 77 allows low temperature cooling water into the mixing chamber 72 as the temperature in the mixing chamber 72 increases due to the presence of high temperature used cooling water therein. The exemplary valve assembly 77 includes a check ball 79 positioned in the flow path of the low temperature cooling water. The check ball rests in a check ball seat 80. Normally, the check ball 79 prevents the flow of low temperature cooling water into the mixing chamber 72 past the check ball seat 80. A ball pin 81, or other mechanism, connected across the end 76 of the mixing valve 20 prevents the check ball 78 from being displaced from the mixing valve 20, without significantly impeding the flow of low temperature cooling water into the mixing valve 20. A wax expansion cartridge 82 is mounted at the end of a spring tube 86 such that the wax expansion cartridge 82 extends into the mixing chamber 72. A plunger shaft 88 and compression spring 84 are connected to an expanding portion of the wax expansion cartridge 82 within the spring tube 86. The plunger shaft 88 extends from the expanding portion of the wax expansion cartridge 82 to a position near the check ball 79.

As the temperature in the mixing chamber 72 increases, such as due to the presence of high temperature used cooling water therein, the expanding portion of the wax expansion cartridge 82 expands, which, in turn, moves the plunger in the direction of the check ball 79. As the plunger 88 moves in the direction of the check ball 79, it will eventually contact the check ball 79 and displace the check ball 79 from the check ball seat 80. When the check ball 79 is displaced from the check ball seat 80, low temperature cooling water from the low temperature cooling water supply 26 connected to the end 76 of the mixing valve 20 will flow past the check ball 79 and the check ball seat 80 into the mixing chamber 72 to mix with the high temperature used cooling water therein to reduce the used cooling water to a lower temperature for either draining or return to the cooling water supply tank 32. As the temperature in the mixing chamber 72 increases to higher levels, the wax expansion cartridge 82 will expand more, thereby moving the plunger shaft 88 further, thereby displacing the check ball 79 further from the check ball seat 80 to allow more low temperature cooling water to flow into the mixing chamber 72.

As the low temperature cooling water and high temperature used cooling water mix in the mixing chamber 72, the temperature in the mixing chamber 72 will rapidly decrease. This reduction in temperature in the mixing chamber 72 will cause the expanding portion of the wax expansion cartridge 82 to contract, allowing the plunger 88 to be moved away from the check ball 79 by the action of the compression spring 84. As the plunger shaft 88 moves away from the check ball 79, the pressure of low temperature cooling water entering the mixing valve 20 will force the check ball 79 back against the check ball seat 80, thereby preventing further flow of low temperature cooling water into the mixing chamber 72 until the temperature in the mixing chamber 72 increases once again.

Mixed cooling water from the mixing chamber 72, which has been reduced to a lower temperature level, exits the mixing valve 20 through a drain port 90 formed therein. As illustrated in FIG. 3, the drain port 90 of the mixing valve 20 may be located at the opposite end 91 of the mixing valve 20 from the end 76 of the valve 20 that is connected to a supply 26 of low temperature cooling water. Alternatively, the drain port 90 may be located at another convenient location on the mixing valve 20 in fluid communication with the mixing chamber 72.

Preferably, a back pressure valve 92 is connected in the mixing valve drain port 90. The back pressure valve 92 allows mixed cooling water from the mixing chamber 72 to exit the drain port 90, while preventing drained cooling water from entering the mixing valve 20 through the drain port 90. Any conventional back pressure valve mechanism may be used to implement the back pressure valve 92.

An exemplary and preferred back pressure valve 92 for use on the mixing valve 20 is illustrated in FIG. 3. The back pressure valve 92 includes an aperture 94 or valve channel formed therethrough which allows a flow of water from the mixing chamber 72 out of the drain port 90. The flow of water through the channel 94 is regulated by a valve flow control member 96. The valve flow control member 96 is connected to a valve shaft 98, which extends through an aperture in the body 99 of the back pressure valve 92. A pressure adjustment nut 100 is attached to the valve shaft 98 at an end thereof opposite the flow control member 96. A compression spring 102 is positioned around the valve shaft 98, and is compressed between the pressure adjustment nut 100 and the body 99 of the back pressure valve 92. The compression spring 102 operates normally to hold the valve flow control member 96 firmly against the back pressure valve body 99, to thereby close the channel 94, thereby preventing the flow of cooling water from the mixing chamber 72. As the water pressure in the mixing chamber 72 increases, the force applied to the valve flow control member 96 through the valve channel 94 will exceed the force applied to the pressure adjustment nut 100 and the valve shaft 98 by the spring 102, thereby forcing the valve flow control member 96 away from the back pressure valve body 99 to open the valve channel 94 to allow cooling water to escape from the mixing chamber 72 through the drain port 90. The position of the pressure adjustment nut 100 and the force exerted by the compression spring 102 on the valve shaft 98 may be selected and/or adjusted to thereby select the water pressure in the mixing chamber 72 at which the back pressure valve 92 will open to allow cooling water to be drained therefrom. Preferably, the back pressure valve 92 will be set to open at a pressure level in the mixing chamber 72 of less than 50 psi, to allow cooling water in the mixing chamber 72 to be drained from the mixing valve 20 at a relatively low pressure level while allowing low temperature and high temperature water to mix in the mixing chamber 72 before the valve 92 is opened.

Other conventional back pressure valve designs may be employed as part of the pressurized mixing valve 20 to control the flow of cooling water from the mixing chamber 72 through the mixing valve drain port 90. For example, as illustrated schematically in FIG. 1, the back pressure valve 92 may include a mechanism 104 connected thereto which allows the pressure level in the mixing chamber 72 at which the back pressure valve 92 opens to be adjusted from outside of the mixing valve 20.

To monitor the pressure and/or temperature level in the mixing valve mixing chamber 72, a temperature/pressure monitoring port 106 is preferably formed in the wall 75 of the mixing valve 20. As illustrated in FIG. 1, a pressure and/or temperature gauge 108 may be mounted in the temperature/pressure monitoring port 106 for monitoring the pressure and/or temperature level within the mixing chamber 72 of the mixing valve 20.

The mixing valve 20 preferably also includes a safety relief valve 110. The safety relief valve 110 is preferably attached to the wall 75 of the pressurized mixing valve 20. The safety relief valve 110 is in fluid communication with the mixing chamber 72 through a port 112 in the wall 75 of the mixing valve 20. The safety relief valve 110 may be implemented in a conventional manner. For example, the safety relief valve 110 may include a check ball 114 and a mechanism 116, such as a compression spring, for biasing the check ball 114 against a check ball seat 118 to thereby prevent the flow of cooling water from the mixing valve mixing chamber 72 past the check ball seat 118. When the pressure level in the mixing chamber 72 exceeds the force of the biasing mechanism 116 on the check ball 114, the check ball 114 will be displaced from the check ball seat 118, thereby allowing the flow of cooling water from the mixing valve 20 past the check ball seat 118 through the safety relief valve 110 and out of a pressure relief outlet port 120.

Preferably, the safety relief valve 110 only opens to allow the flow of cooling water from the mixing valve 20 when the pressure level in the mixing chamber 72 increases to a pressure level much higher than the pressure level required to open the back pressure valve 92. Thus, the safety relief valve 110 preferably only opens when the back pressure valve 92 fails, to thereby relieve the pressure in the mixing chamber 72 to prevent damage to the mixing valve 20 when the pressure in the mixing chamber 72 becomes excessive. The safety relief valve 110 may preferably be set to open at a pressure level which is greater than the pressure level required to open the back pressure valve 92, but which is less than approximately 80 psi.

When the pressure relief valve 110 is opened, elevated pressure cooling water exits the valve 110 through the pressure relief outlet port 120. Cooling water from the pressure relief outlet port 120 may simply be drained away. For a closed loop high temperature injection mold cooling system in accordance with the present invention, however, the elevated pressure cooling water emerging from the pressure relief outlet port 120 is preferably returned to the cooling water supply tank 32. An elevated pressure cooling water return port 122 may be provided in, for example, a cover 121, of the cooling water supply tank 32 (FIG. 1). The pressure relief outlet port 120 may be connected to the elevated pressure cooling water return port 122 in the cooling water supply tank 32, to provide the elevated pressure cooling water from the pressure relief outlet port 120 to the supply tank 32 in a conventional manner.

In accordance with the present invention, water is employed as a cooling fluid for controlling the temperature of a high temperature injection mold. The use of water as a cooling fluid eliminates the danger of hot oil fires which can occur in injection mold cooling systems employing petroleum-based oil as a cooling fluid. Water also has a better heat transfer rate than conventionally used petroleum-based or mineral oil heat transfer fluids. Thus, the present invention provides for more rapid and efficient mold cooling, thereby providing for increased production rates. The use of cooling water as a cooling fluid also eliminates the potential for damage to injection molded objects due to contamination from the cooling fluid. Hydrocarbons from oil-based cooling fluids may make their way into an injection mold or into the molded part, thereby damaging the injection molded object, requiring that the object be repaired before being sold, or scrapped. Water is also a less expensive and more readily available cooling fluid than conventional oil-based heat transfer fluids.

High temperature injection mold cooling in accordance with the present invention may employ either elevated pressure or low pressure cooling water. Elevated pressure cooling water in accordance with the present invention is defined as cooling water which has been pressurized to a pressure level such that the cooling water will remain in a liquid state as the cooling water flows through the cooling channels of a high temperature injection mold. In contrast, low pressure cooling water is defined as cooling water maintained at a pressure level such that the cooling water enters the cooling channels of a high temperature injection mold in the liquid state and transfers to the vapor state within the high temperature injection mold cooling channels.

Figure 4:
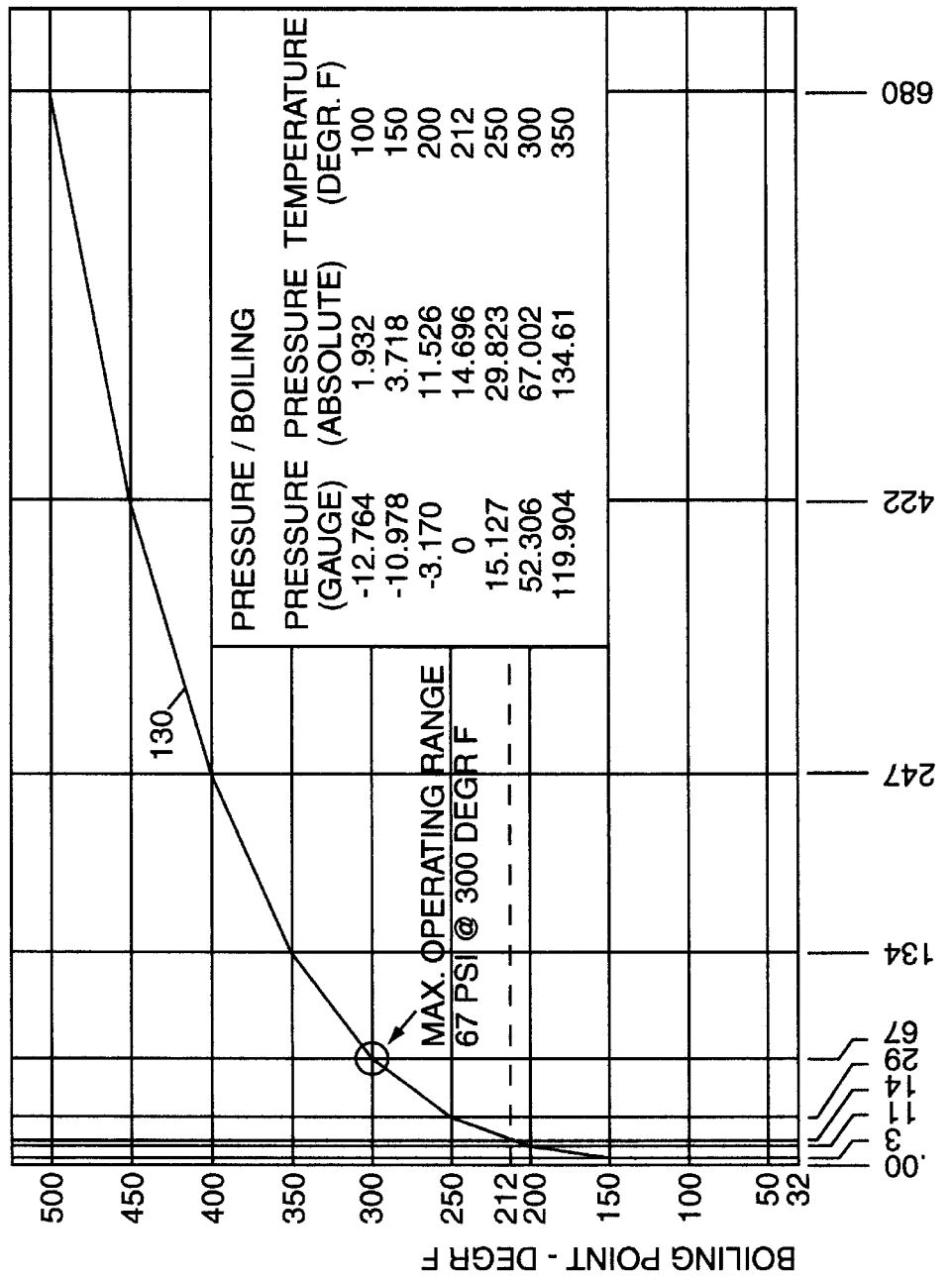
FIG. 4 is a chart showing the boiling point of water for various water pressure levels.

Curve 130 in the graph of FIG. 4 shows the boiling point of water (in degrees F.) at various water pressure levels (in psi-absolute). As illustrated, the boiling point of water increases with increased water pressure. At a water pressure level of 67 psi, for example, water will remain in a liquid state up to 300° F. Thus, for a high temperature injection mold which operates at 300° F., elevated pressure cooling water in accordance with the present invention must be pressurized to at least 67 psi.

Using the definitions provided above, whether cooling water at any particular pressure level in accordance with the present invention is considered elevated pressure or low pressure cooling water will depend on the operating temperature of the injection molding process with which the cooling water is employed. For a given operating temperature, low pressure cooling water is cooling water at a pressure level to the left of the curve 130 in FIG. 4, and elevated pressure cooling water in accordance with the present invention is cooling water at a pressure level to the right of the curve 130 in the graph of FIG. 4. For example, cooling water at 67 psi is elevated pressure cooling water when used for controlling the temperature of a high temperature injection molding process operating at 250° F. At these temperature and pressure levels, the cooling water will remain in a liquid state as the cooling water passes though the cooling channels in the high temperature injection mold. However, cooling water at 67 psi is low pressure cooling water when used for controlling the temperature of an injection molding process operating at 350° F. At these temperature and pressure levels, the cooling water will vaporize within the cooling fluid channels of the high temperature injection mold.

Either elevated pressure or low pressure cooling water may be employed in accordance with the present invention. The use of low pressure cooling water in accordance with the present invention may be preferred in many cases. The equipment required to pressurize water to elevated pressure levels, and to maintain the water at such pressure levels, will generally be more complicated and expensive than the equipment required to pump low pressure cooling water through a high temperature injection mold cooling system in accordance with the present invention. Low pressure cooling water in accordance with the present invention may also provide more effective mold cooling than elevated pressure cooling water. Low pressure cooling water, by definition, vaporizes within the cooling channels of a high temperature injection mold. A high rate of heat removal is achieved as the water passes through the latent heat phase, from the liquid to the vapor state, in the cooling channels. Thus, low pressure cooling water in accordance with the present invention can provide more efficient heat removal, with a minimum of cooling water used.

Low pressure cooling water must typically be employed in a closed loop rather than an open loop high temperature injection mold cooling system in accordance with the present invention. As low pressure cooling water vaporizes in the cooling channels of a high temperature injection mold, any minerals or other contaminants in the cooling water will rapidly deposit on and build up in the cooling channels. Such a buildup of minerals or other contaminants in the injection mold cooling channels will adversely affect cooling efficiency. As the cooling channels become completely blocked with such contaminants, the injection molding process must be shut down to clean the cooling channels. To prevent a rapid buildup of minerals or other contaminants in the injection mold cooling channels, water which has been demineralized by softening, or otherwise treated to remove the mineral content and other contaminants therefrom, is preferably employed. Such treated cooling water is preferably provided by a closed loop high-temperature injection mold cooling system in accordance with the present invention, as described previously.

A buildup of minerals or other contaminants in the injection mold cooling channels will also occur, albeit more slowly, if untreated elevated pressure cooling water in accordance with the present invention is employed. Therefore, it is preferred that a closed loop high temperature injection mold cooling system in accordance with the present invention also be employed for high temperature injection mold cooling systems wherein elevated pressure cooling water is used.

An exemplary high temperature injection molding process cycle employing high temperature injection mold cooling in accordance with the present invention will now be described with reference to FIGS. 1 and 2. The parts 16A and 16B of the high temperature injection mold 16 are brought together such that the injection mold 16 is closed and the molding surfaces 50A and 50B of the mold parts 16A and 16B form a molding cavity defining the shape of an object 52 to be molded. The process controller 22 determines, e.g., via the temperature sensor 64 mounted in the injection mold 16, the temperature of the injection mold 16. The process controller 22 controls the power transformer and switches in the heater controller 57 to provide power to the electric heaters 56 mounted in and around the injection mold 16, to thereby raise the mold temperature to the desired level for injection molding. The appropriate temperature for the injection mold 16 will depend upon the injection molding material to be used. For plastic materials, the temperature of the steel forming the injection mold 16 may, for example, be raised to a set point of approximately 300° F. The process controller 22 may control the heaters 56 to raise the mold temperature to a desired operating temperature level by either turning the heaters 56 full on until a desired mold temperature level is reached, by pulsing the heaters 56 on and off, or by a combination of full-on and pulse control. For example, the process controller 22 may turn the heaters 56 full on until a first temperature level (e.g., 280° F.) is reached, and then pulse the heaters 56 until the desired operating set point temperature level is reached. Pulsing the heaters 56 allows better control of the temperature increase, preventing overshoot of the desired operating temperature.

Once the temperature of the injection mold 16 has reached the desired level, a molten material, e.g., in this case, molten plastic, is injected into the mold 16 through the aperture 54 therein. The molten material will typically be injected at a temperature greater than the initial temperature of the injection mold 16. For example, plastic molten material may typically be injected into the mold 16 at approximately 700° F. The very hot molten material injected into the mold 16 causes the temperature of the mold 16 to increase rapidly. This rapid increase in temperature is detected by the process controller 22, e.g., via the temperature sensors 64 mounted in the injection mold 16. When the temperature of the mold 16 rises above a selected set point, process controller 22 provides control signals to the cooling fluid control valves 14 to open the valves 14. Either elevated or low pressure cooling water is thereby admitted through the cooling fluid control valves 14 into the cooling fluid channels 18 in the injection mold. As described previously, the cooling water may be provided from a plant water supply (open loop system) or a cooling water supply tank 32 (closed loop system). If elevated pressure cooling water is employed in the high temperature injection mold cooling system, the cooling water will remain in a liquid state as the cooling water passes through the cooling fluid channels 18. If low pressure cooling water is used in the high temperature injection mold cooling system, the cooling water will vaporize in the injection mold cooling fluid channels 18. In either case, the flow of cooling water in the cooling fluid channels 18 will lower the temperature of the injection mold 16.

When the temperature of the high temperature injection mold 16 has been reduced to the desired temperature level, the process controller 22 closes the cooling fluid control valves 14 to interrupt the flow of cooling water through the cooling fluid channels 18 in the injection mold 16. The process controller 22 opens and closes the cooling fluid control valves 14 as necessary to reduce and maintain the temperature of the injection mold 16 at the desired level such that the temperature of the mold surfaces 50A and 50B is maintained at the optimum level, per material manufacturer specifications, to cure the injection molded object 52 at the most rapid rate possible to both maintain optimum quality as well as maximize production rates. Once the injection molded object 52 has cured, the parts 16A and 16B of the injection mold are separated to open the mold 16 and release the completely formed object 52 therefrom. The injection molding process cycle may then be repeated.

In passing through the cooling fluid channels 18 in the high temperature injection mold 16 elevated or low pressure cooling water is heated to a high temperature level. This used high temperature cooling water, in liquid or vapor form, is channeled through a manifold, such as the pressurized mixing valve 20, before being drained or returned to the cooling water supply tank 32. As described previously, the high temperature used cooling water from the injection mold 16 is preferably mixed with low temperature cooling water in the mixing valve 20, to reduce the temperature of the used cooling water, before the cooling water is drained or returned to the cooling water supply tank 32.

Excess heat is removed efficiently from a high temperature injection mold 16 using elevated pressure or low pressure cooling water in accordance with the present invention. This allows optimum mold surface temperatures to be achieved rapidly and maintained to obtain optimum product quality. Since a high temperature injection mold can be cooled rapidly using elevated pressure or low pressure cooling water in accordance with the present invention, an injection mold 16 can be made ready for successive production cycles more rapidly, thereby increasing production rates.

Elevated pressure or low pressure cooling water may be employed for high temperature injection mold cooling in accordance with the present invention in combination with any process control method for controlling the flow of cooling water through the cooling channels 18 in an injection mold 16 to maintain the mold 16 at a desired temperature level. For example, rather than controlling the flow of cooling water through the cooling channels 18 in the injection mold 16 based on the sensed temperature of the injection mold 16, the cooling fluid control valves 14 may be operated by the process controller 22 to provide a flow of cooling water into the cooling channels 18 of the injection mold 16 at specific points in time during the injection molding cycle. In such a temperature control process, the cooling fluid control valves 14 may be held open for a specific duration of time during the injection molding cycle, or may be held open long enough for a specific volume of cooling water to pass through the valves into the cooling fluid channels 18 of the injection mold 16. Conventional rotary turbine flow sensors (not shown) may be used to detect the volume of water flowing through the valves 14 into the cooling fluid channels 18 of the injection mold 16. The duration of time the valves 14 are held open during a cycle, or the volume of water required to flow through the valves 14, to cool the injection mold 16 to the desired level, may be calculated by or programmed into the process controller 22 in a conventional manner. For example, the duration or volume of the cooling water pulses may be determined based on the measured temperature of the mold 16 or of the cooling water leaving the mold 16. Multiple pulses of cooling water may be provided each cycle.

All of the cooling fluid control valves 14 need not be opened and closed simultaneously. Each cooling fluid control valve 14 may be controlled independently to provide a different amount of cooling water, or a different duration of cooling water flow, through different cooling fluid channels 18 in the injection mold 16 to achieve optimum injection mold cooling. Independent control of individual cooling fluid control valves 14 may be implemented by the process controller 22 based on either temperature information, obtained from the temperature sensors 64 mounted in the injection mold 16, or based on specific points in time during the injection molding cycle, or a combination of both. The optimal distribution of cooling water through different cooling fluid channels 18 in the injection mold 16 depends on the shape of the injection molded object and the positions of the cooling fluid channels 18 in the injection mold 16. The optimal distribution of cooling water for a given mold 16 may be calculated and programmed into the process controller 22 in a conventional manner.

Figure 5:
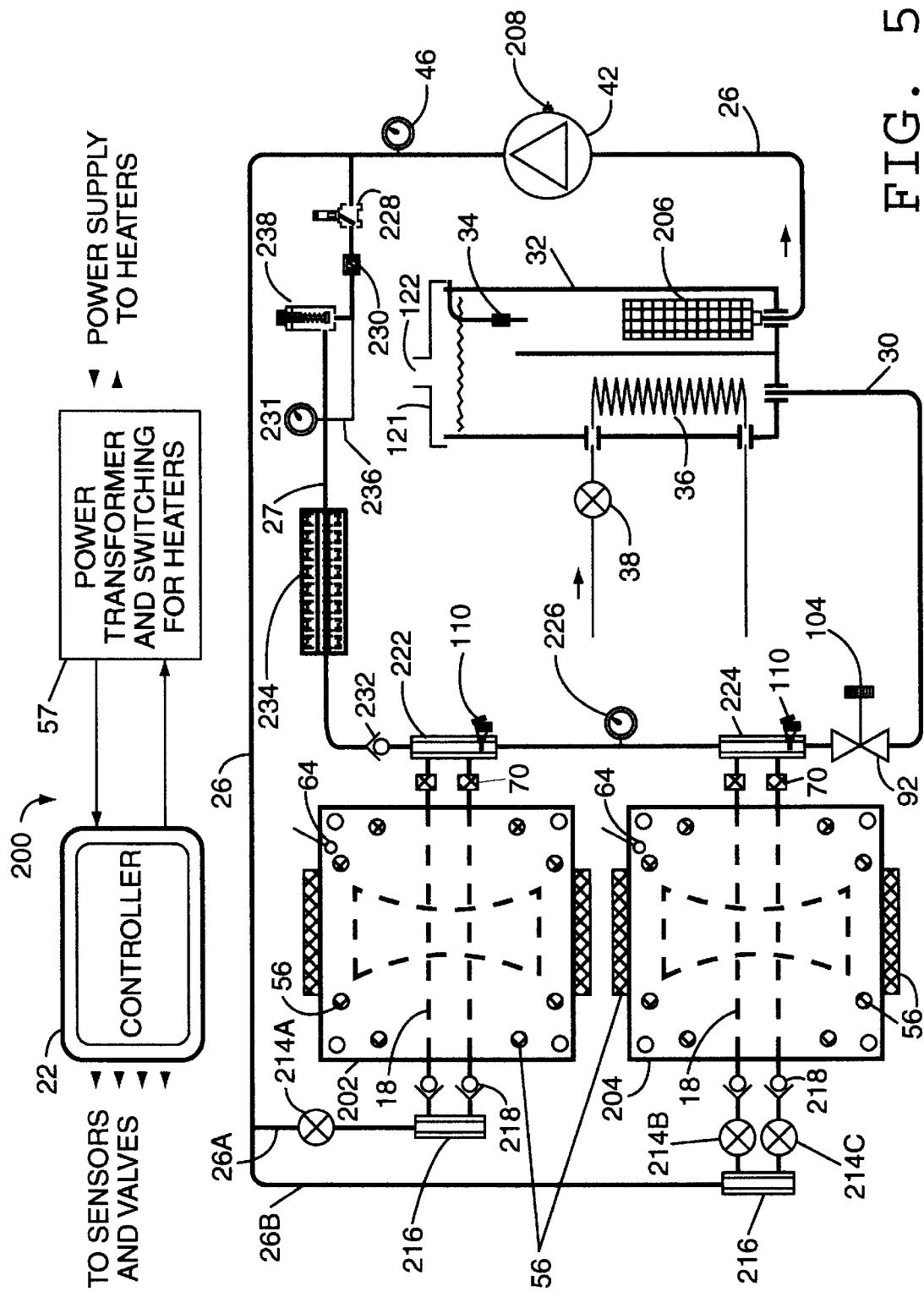
FIG. 5 is a schematic illustration of another exemplary high temperature injection mold cooling system in accordance with the present invention, wherein multiple high temperature injection molds are temperature controlled using treated (e.g., demineralized) cooling water from a single cooling water supply tank.

Another exemplary embodiment of a high temperature injection mold cooling system in accordance with the present invention is illustrated in, and will be described with reference to, FIG. 5. The high temperature injection mold cooling system 200 illustrated in FIG. 5 is a closed loop injection mold cooling system in accordance with the present invention, wherein cooling water from a single cooling water supply tank 32 is used to control the temperature of multiple high temperature injection molds. Many components of the high temperature injection mold cooling system 200 of FIG. 5 are identical, or substantially similar, to corresponding components of the exemplary high temperature injection mold cooling system 10 of FIG. 1 and, therefore, are labeled with the same reference numerals as used in FIG. 1 and will not be described in further detail hereinafter. However, the exemplary high temperature injection mold cooling system 200 of FIG. 5 also illustrates additional features which may be included in a high temperature injection mold cooling system in accordance with the present invention, which will now be described in more detail.

In the exemplary high temperature injection mold cooling system 200 of FIG. 5, two injection molds 202 and 204 are each independently cooled in accordance with the present invention with cooling water provided from a cooling water supply tank 32. As described previously, the cooling water in the cooling water supply tank 32 is preferably treated, e.g., softened, to remove minerals and other contaminants therefrom. The water level in the cooling water supply tank 32 is maintained at a relatively constant level using, e.g., a mechanism 34, such as a float switch, which turns on to admit additional treated cooling water into the cooling water supply tank 32 if the level of cooling water in the cooling water supply tank becomes too low. The cooling water supply tank 32 preferably includes a heat exchanger 36, which may be mounted within the cooling water supply tank 32, to maintain the temperature of the cooling water in the cooling water supply tank 32 at a desired level. If the temperature of the cooling water in the cooling water supply tank 32 becomes too high, a valve 38 is opened to allow low temperature fluid, such as low temperature water, to flow through the heat exchanger 36 to thereby reduce the temperature of the cooling water in the cooling water supply tank 32.

Cooling water from the cooling water supply tank 32 is provided to the injection molds 202 and 204 on cooling water supply line 26. An in-line filter screen 206 may be provided in the cooling water supply tank 32 to filter any particle contaminants from the cooling water before the cooling water is drawn from the supply tank 32 into the supply line 26. A pump 42 pumps the cooling water from the cooling water supply tank 32 on the supply line 26 to the injection molds 202 and 204. As described previously, the pump 42 may be implemented in a conventional manner to pump water from the supply tank 32 to the injection molds 202 and 204 at either an elevated or low pressure level. The pump 42 may preferably include a high temperature cutout switch 208, which automatically turns off the pump 42 if the temperature of the cooling water flowing through the pump exceeds a preset high temperature level. This will prevent damage to the system which may be caused by pumping high temperature cooling water through the system if the mechanisms for reducing the temperature of the cooling water in the cooling water supply tank 32 fail. A pressure gauge 46, which may be connected to the cooling water supply line 26 on the high pressure side of the pump 42, may be provided to provide an operator of the high temperature injection mold cooling system 200 with an indication of the pressure level of the cooling water being provided on the cooling water supply line 26 to the injection molds 202 and 204.

The high temperature injection molds 202 and 204 are provided with cooling water from the cooling water supply tank 32. Each of the injection molds 202 and 204 is provided with cooling water by a branch 26A or 26B of the cooling water supply line 26. Each high temperature injection mold 202 and 204 includes cooling channels 18 formed therein. Each high temperature injection mold 202 and 204 may also include electric heating elements 56 positioned therein or there around, and a temperature sensor 64 positioned therein. As described previously, the heating elements 56 are provided with power from a power supply via a power transformer and switching elements in a heater controller 57. Temperature signals from the temperature sensors 64 are provided to the system controller 22. Based on these temperature signals, the process controller 22 controls the electric heater controller 57 to provide power to the electric heating elements 56 to raise the temperature of the injection molds 202 and 204 to a desired level. Also based on the temperature signals from the temperature sensor 64, the process controller 22 provides control signals to cooling fluid control valves 214A, 214B, or 214C, to open the valves to provide a flow of cooling water from the cooling water supply line 26 through the cooling channels 18 in the injection molds 202 and 204 to reduce the temperature of the injection molds 202 and 204. Each of the cooling fluid control valves 214A, 214B, or 214C may be independently controlled to provide different durations of cooling water flow or different cooling water flow volumes to each injection mold 202 and 204 or to different cooling fluid channels 18 within a particular injection mold 204. Conventional supply manifolds 216 may be connected between the cooling fluid control valves 214 and the cooling channels 18 in the injection mold 202, or between the cooling water supply line 26B and multiple cooling fluid control valves 214B and 214C, to distribute the cooling water from the cooling water supply line 26 among multiple cooling channels 18 formed in the high temperature injection molds 202 and 204. Conventional check valves 218 prevent backflow of cooling water from the cooling channels 18 in the injection molds 202 and 204 to the cooling water supply line 26.

In accordance with the present invention, multiple high temperature injection molds 202 and 204 may be cooled by either elevated pressure or low pressure cooling water flowing into the cooling channels 18 of the injection molds 202 and 204. As described previously, elevated pressure cooling water will remain in a liquid state while in the cooling channels 18, whereas low pressure cooling water will vaporize within the cooling channels 18. The flow of elevated pressure or low pressure cooling water into the cooling channels 18 of the injection molds 202 and 204 may be controlled by the process controller 22 using a variety of control schemes, as described previously. For example, the flow of cooling water into the cooling channels 18 may be controlled based on the temperature of the injection mold 202 or 204 as sensed using the temperature sensors 64 mounted therein. Alternatively, the cooling fluid control valves 214A, 214B, and 214C may be opened for predetermined durations at particular times during the injection molding cycle, or may be opened to allow specific volumes of cooling water to be admitted into the cooling channels 18 at specific times during the injection molding cycle. Different control schemes may be used to control the flow of cooling water to each of the injection molds 202 and 204.

Used high temperature cooling water from the cooling channels 18 of each injection mold 202 and 204 is screened by a screen 70 before being provided to return manifolds 222 and 224, respectively. The return manifolds 222 and 224, for each injection mold 202 and 204, respectively, may be connected together in series with a cooling water return line 30. Used cooling water from the cooling channels 18, which emerges from the cooling channels 18 at a high temperature level, is preferably mixed with low temperature cooling water from the cooling water supply tank 32 in the return manifolds 222 and 224 before being returned on the return line 30 to the cooling water supply tank 32. Each return manifold 222 and 224 may be implemented using a pressurized mixing valve 20 as described previously with reference to FIG. 3. Each return manifold 222 and 224 thus preferably includes a safety relief valve 110 which opens to release cooling water from the manifolds 222 and 224 if the pressure level within the manifolds 222 and 224 reaches an excessive level. Cooling water released through the safety relief valves 110 may be drained or returned to the cooling water supply tank 32, such as via a return port 122 in a cover 121 of the cooling water supply tank 32. Since the return manifolds 222 and 224 are connected in series, a single back pressure valve 92 may be used to control the flow of mixed cooling water from the manifolds 222 and 224 through the cooling water return line 30 to the cooling water supply tank 32. The back pressure valve 92 may be adjustable, via a pressure adjustment mechanism and knob 104, to thereby allow adjustment of the pressure level at which cooling water from the return manifolds 222 and 224 is returned on the cooling water return line 30 to the cooling water supply tank 32. A pressure gauge 226 may be positioned on the cooling water return line 30 between the return manifolds 222 and 224 to thereby provide an indication of the cooling water pressure on the return line 30 to an operator of the high temperature injection mold cooling system 200.

Cooling water is provided from the cooling water supply tank 32 to the return manifolds 222 and 224 for mixing with the high temperature used cooling water from the injection mold cooling channels 18 on a branch 27 of the cooling water supply line 26. A flow switch 228 is used to assure the flow of cooling water on the branch line 27. A flow indicator 230, such as a rotary turbine flow sensor, may be connected in the cooling water supply line branch 27 such that the flow of cooling water through the branch line 27 may be monitored. A check valve 232 on the cooling water branch line 27 prevents high temperature used cooling water from the cooling channels 18 of the injection molds 202 and 204 from flowing back into the cooling water branch line 27. A pressure gauge 231 may be provided on the cooling water branch line 27 so that the water pressure in the branch line 27 may be monitored by an operator of the high temperature injection mold cooling system 200.

The low temperature cooling water in the branch line 27 may also be used to cool the switching devices in the heater controller 57 which are used to control the flow of electrical power to the injection mold heating elements 56. The switching devices may typically be implemented as solid state relays which require cooling. Cooling of the relays may be provided by running the cooling water branch supply line 27 through a solid state relay heat sink manifold 234 which is thermally connected to the solid state relay switching devices in the heater controller 57, to thereby remove excess heat from the solid state relays. A fixed minimum bypass line 236 is preferably provided on the cooling water branch supply line 27 to ensure that at least a minimum amount of cooling water flows through the branch line 27 to cool the relay heat sink manifold 234. A bypass regulator 238 on the branch line 27 is used to control the flow of cooling water through the cooling water branch supply line 27 and the bypass line 236.

It should be understood that the present invention is applicable to high temperature injection mold cooling systems wherein more than two high temperature injection molds are cooled using elevated pressure or low pressure cooling water in accordance with the present invention, and wherein such multiple high temperature injection molds are connected either in series or in parallel. It should also be apparent that multiple high temperature injection molds, connected in series or in parallel, may be cooled using elevated pressure or low pressure cooling water provided from a plant cooling system, or an external source, rather than a cooling water supply tank 32, although the use of cooling water which has been treated to remove minerals and other contaminants therefrom is preferred for the reasons described previously.

In accordance with the present invention, low pressure or elevated pressure cooling water is circulated through fluid channels formed in a mold to reduce the temperature of the mold. In accordance with the present invention, heating water may be circulated through the same fluid channels to raise the temperature of the mold. Thus, a complete mold temperature control system may be implemented in accordance with the present invention using elevated or low pressure cooling water in combination with heating water to control the temperature of a mold.

An exemplary mold temperature control system 300 in accordance with the present invention, for providing cooling water or heating water, as necessary, to fluid channels formed in an injection mold, to control the temperature of the mold, is illustrated in, and will be described in detail with reference to, FIGS. 6–9. As discussed previously, an injection mold typically includes two or more mold parts. In the exemplary system 300, an exemplary mold includes a stationary or cover portion 302 and a movable or ejector portion 304. Mold portions 302 and 304 have fluid channels formed therethrough in the manner described previously. In the exemplary system 300, each mold part has six zones of fluid channels formed therethrough. It should be understood that a mold temperature control system in accordance with the present invention may be used to control the flow of cooling water or heating water through more or fewer than six zones of fluid channels in each part of an injection mold, and that each fluid channel zone may include one or more fluid channels formed in the parts 302 and 304 of the mold.

In the exemplary mold temperature control system 300 of FIGS. 6–9, one of the fluid channel zones is dedicated to carrying heating water. The flow of heating water into this zone is controlled by fluid control valves 306, on the movable side 302 of the mold, and 308, on the stationary side 304 of the mold. Either elevated or low pressure cooling water, or heating water, may be circulated through the other five fluid channel zones in each part 302 and 304 of the mold. The flow of cooling water or heating water through these fluid channel zones is controlled by fluid control valves 310, on the movable side 302 of the mold, and 312, on the stationary side 304 of the mold. As discussed previously, the fluid control valves 306, 308, 310, and 312 may be implemented in a conventional manner, preferably as electronically controlled valves. Note that the fluid control valves 306, 308, 310, and 312 may be positioned on either the input side, output side, or, as illustrated in FIGS. 6–9, both the input and output sides of the fluid channels formed in the injection mold parts 302 and 304, to control the flow of cooling and heating water through the fluid channels.

Either low pressure or elevated pressure cooling water is provided from a supply of cooling water to the mold temperature control system 300 on a cooling water supply line 314, and is returned to the supply of cooling water on cooling water return line 316. The cooling water provided on cooling water supply line 314 may be low pressure or elevated pressure cooling water provided from an open loop or closed loop system, as described previously. As described previously, cooling water is provided from a plant cooling water supply in an open loop system, and is provided from and returned to a cooling water supply tank in a closed loop system. Cooling water from a closed loop system, wherein cooling water which has been treated to remove minerals and other contaminants therefrom is provided from a cooling water supply tank, and wherein the temperature of the cooling water in the cooling water supply tank is controlled, as described previously, is preferred.

Heating water is provided to the fluid control valves 306, 308, 310, and 312 from a heating water supply system. The heating water supply system preferably includes a heating water supply tank 318, in which the heating water is stored. The heating water in the heating water supply tank 318 is maintained at a desired temperature level. A heating element 320 may be provided in the heating water supply tank 318 to heat the heating water in the supply tank 318 to the desired heating water temperature level. A conventional electric heating element 320 may be employed for this purpose. The heating element 320 may be independently controlled or controlled by a process controller (not shown in FIGS. 6–9) based on a water temperature signal provided from a temperature sensor mounted in the heating water supply tank 318.

A pump 322 is provided to pump heating water in the heating water supply tank 320 through the fluid channels formed in the parts 302 and 304 of the mold. The pump 322 may be implemented in a conventional manner, and is preferably controlled by the process controller.

A line 324 preferably connects the heating water supply with the supply of cooling water provided on cooling water supply line 314 or cooling water return line 316. A valve 326 provided on the line 324 may be opened to admit cooling water from the supply 314 or return 316 line into the heating water supply system to replace heating water lost therefrom. The valve 326 may be implemented in a conventional manner, and may be manually operated or automatically operated by the process controller to admit water into the heating water supply to maintain the desired level of heating water in the heating water supply tank 318. Since the cooling water provided on the supply 314 and return 316 lines is preferably treated water, the heating water in the heating water supply tank 318 is also preferably treated water.

An emergency pressure/temperature relief valve 328 is preferably also provided in the heating water supply system. The emergency pressure/temperature relief valve 328 may be implemented in a conventional manner to open automatically to release water from the heating water supply system if the pressure of the heating water in the heating water supply system exceeds a safe pressure level.

Control valves 330 and 332 are operated to control a flow of either cooling water or heating water to the fluid control valves 310 and 312, respectively, on the movable 302 and stationary 304 sides of the mold. The control valves 330 and 332 may be implemented in a conventional manner. Preferably, the control valves 330 and 332 are implemented using one or more conventional electronically or pneumatically operated valves which may be operated to provide either cooling water, from the cooling water supply 314 and return 316 lines, or heating water, from the heating water supply system, to the fluid control valves 310 and 312.

Figure 6:
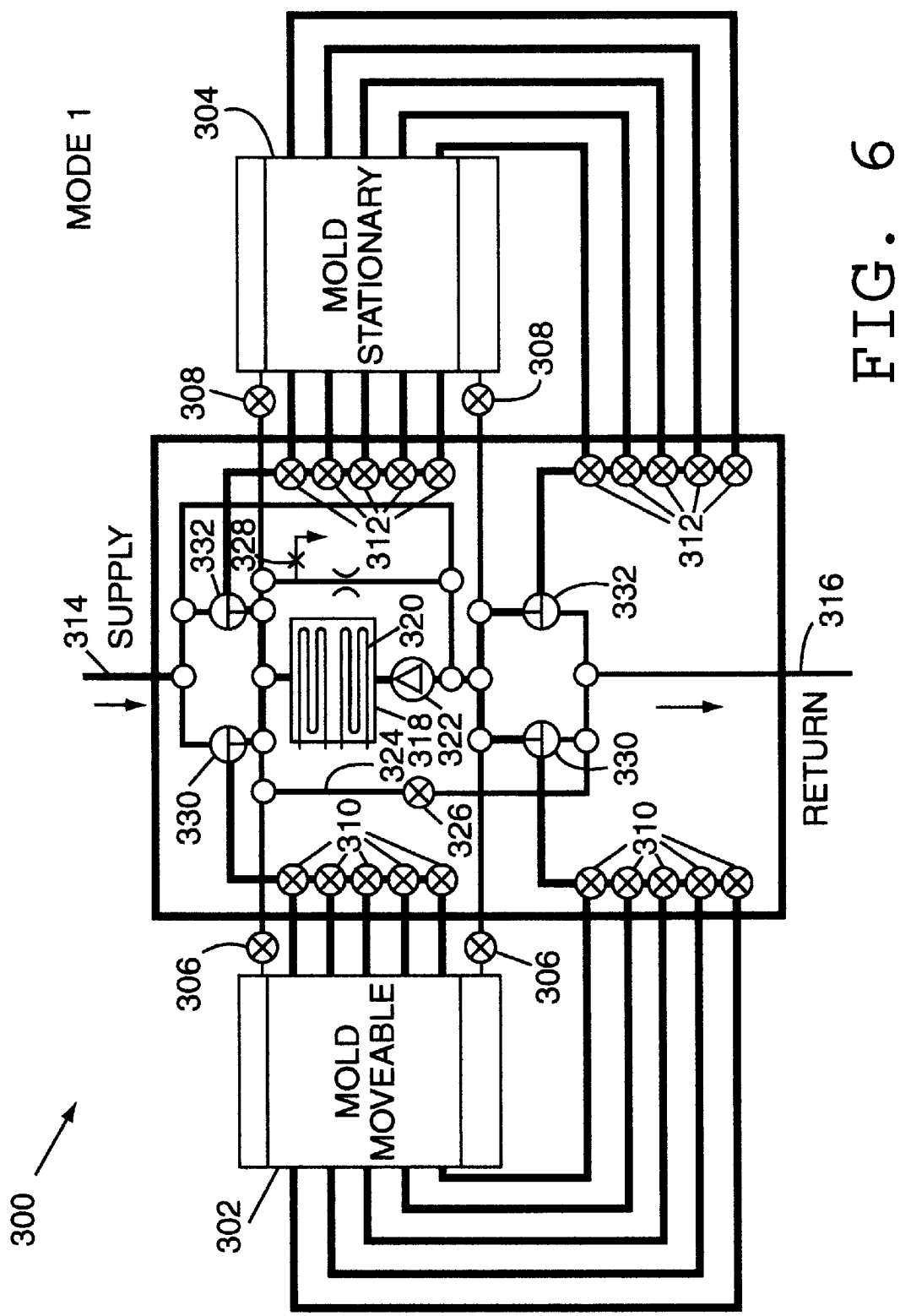
FIGS. 6–9 are schematic illustrations of an injection mold temperature control system in accordance with the present invention, wherein cooling water and heating water are employed alternately or simultaneously to control the temperature of an injection mold, showing various modes of operation of the injection mold temperature control system.

In accordance with the present invention, the control valves 330 and 332, and the fluid control valves 306, 308, 310, and 312, are controlled by a process controller to control a flow of cooling water, heating water, or a combination of cooling water and heating water through the fluid channels formed in the parts 302 and 304 of an injection mold, to thereby control the temperature of the mold during an injection molding cycle. For example, as illustrated in FIG. 6, the fluid control valves 330 and 332 may be operated to connect the heating water supply system to the fluid control valves 310 and 312. The heating water pump 322 may be turned on, and the fluid control valves 310 and 312 opened to provide a preferably continuous flow of heating water through the fluid channels formed in both parts 302 and 304 of the mold. The flow of high temperature heating water through the fluid channels formed in the mold will cause the temperature of the mold to rise to a desired operating temperature. As described previously, the temperature of the injection mold may be monitored, and the fluid control valves 310 and 312 closed when the mold temperature has increased to a desired level. This mode of operation may be employed, for example, to bring the temperature of the injection mold parts 302 and 304 up to a desired operating temperature level before a high temperature molding material is injected into the mold.

Figure 7:
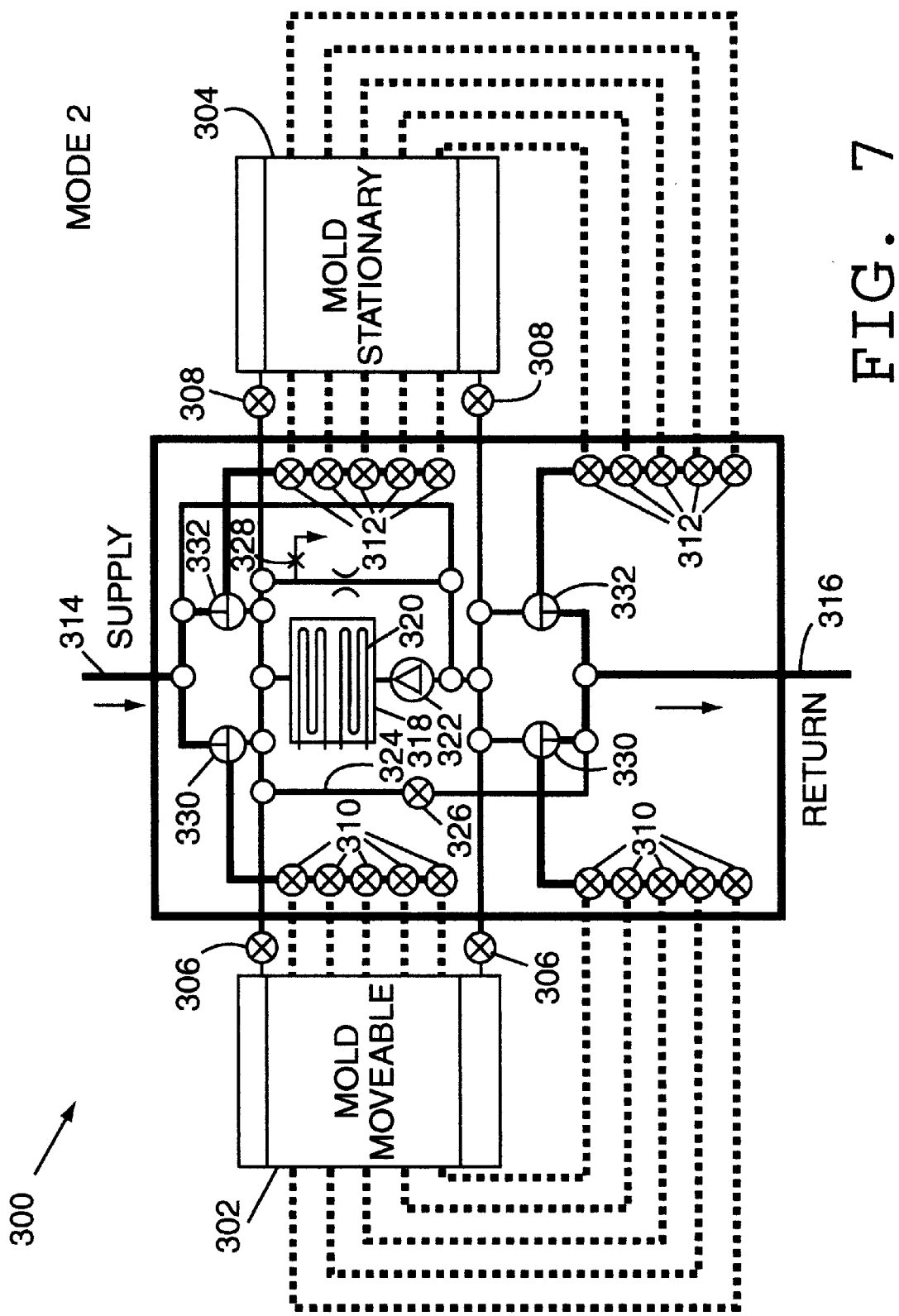

As illustrated in FIG. 7, the control valves 330 and 332 may be operated to connect the low pressure or elevated pressure cooling water provided on cooling water supply 314 and return 316 lines to the fluid control valves 310 and 312. The fluid control valves 310 and 312 may then be operated to provide a flow of cooling water through the fluid channels formed in the parts 302 and 304 of the injection mold, to thereby reduce the temperature of the mold. As described previously, the flow of cooling water through the injection mold fluid channels may be controlled based on the sensed temperature of the injection mold, or cooling water pulses of selected duration or volume of cooling water may be provided through the cooling fluid channels at selected points in time during the injection molding cycle. (The dashed lines in FIGS. 7–9 indicate such exemplary cooling water pulse cooling of the injection mold parts 302 and 304.) For example, pulses of cooling water may be provided through the fluid channels formed in the mold parts 302 and 304 following the injection of hot molding material into the injection mold. The duration of the cooling water pulse, or the volume of cooling water provided in the pulse, may be adjusted based on the measured or predicted rise in temperature of the mold.

Figure 8:
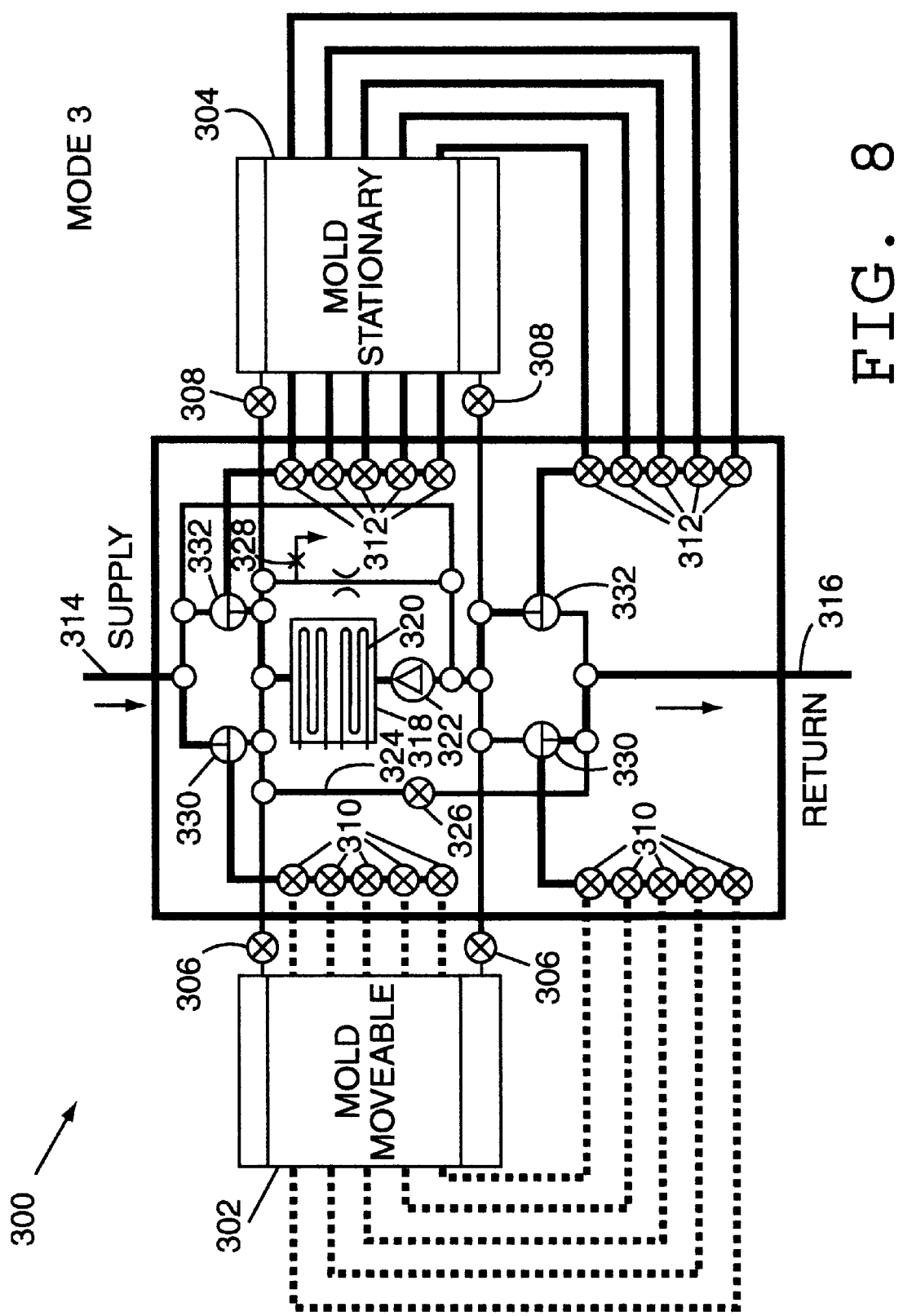

Different parts of an injection mold may require different rates of cooling and/or heating to maintain different parts of the mold at desired temperature levels to ensure that the object formed in the mold is set and cured at an optimal rate to both maintain the quality of the molded object and minimize the setting or curing time to maximize production rates. This may require that one part of the mold be cooled while another part of the mold is heated. The present invention provides for such simultaneous cooling and heating of an injection mold using low or elevated pressure cooling water in combination with heating water provided simultaneously through different fluid channels formed in various parts of an injection mold. Exemplary simultaneous cooling of one part 302 of a mold while another part 304 of the mold is heated is illustrated in, and will be described with reference to, FIG. 8. As illustrated in FIG. 8, control valve 330 may be controlled to provide cooling water from the cooling water supply 314 and return 316 lines to the fluid control valves 310 on the movable side 302 of the mold. Simultaneously, control valve 332 is operated to provide heating water from the heating water supply to the fluid control valves 312 on the stationary side 304 of the mold. The fluid control valves 310 may then be controlled to provide, e.g., pulses of cooling water through the fluid channels formed in the movable part 302 of the injection mold, to cool the movable part 302 of the injection mold, while fluid control valves 312 are operated to provide a simultaneous flow of heating water through the fluid channels formed in the stationary part 304 of the mold, to raise the temperature of the stationary part 304 of the mold.

Figure 9:
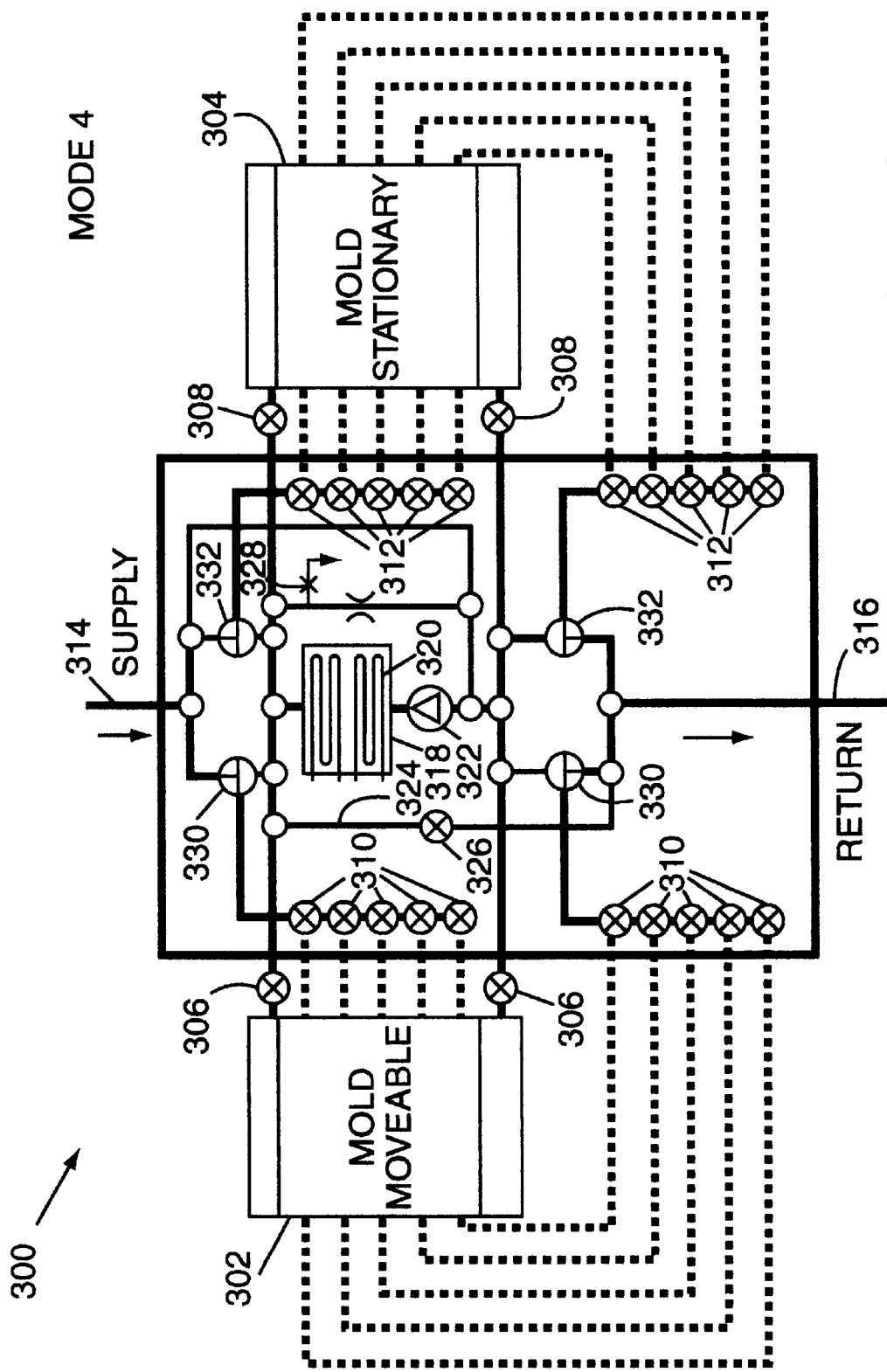

Depending upon the shape of the object to be molded, and the molding process employed, optimal mold temperature control may require simultaneous heating and cooling of different portions of the same part of an injection mold. For example, as illustrated in FIG. 9, control valves 330 and 332 may be operated to connect low pressure or elevated pressure cooling water provided on cooling water supply 314 and return 316 lines to the fluid control valves 310 and 312 on the movable 302 and stationary 304 sides of the injection mold. Thus, fluid control valves 310 and 312 may be controlled to provide, e.g., pulses of low pressure or elevated pressure cooling water through, for example, up to five zones or more of fluid channels formed in each part 302 and 304 of the mold. Simultaneously, fluid control valves 306 and 308 may be controlled to provide heating water from the heating water supply system through other fluid channels formed in the parts 302 and 304 of the injection mold.

It should be understood that the various features of the present invention illustrated and described herein may be combined in various ways. For example, simultaneous water cooling and water heating may be provided for different molds or different parts of the same mold, the pressure relief valve 20 may be employed in any embodiment of the invention, and any of various methods for controlling the flow of heating and/or cooling water through mold fluid channels may be employed in combination with any embodiment of the invention described herein.

It is understood that the present invention is not limited to the particular exemplary embodiments and applications described herein, but embraces all modified forms thereof as come within the scope of the following claims.

What is claimed is:

1. A method for controlling the temperature of a fluid cooled high temperature injection mold having fluid channels formed therein, comprising the steps of:

(a) injecting a molten material into the mold to thereby raise the temperature of the mold at the fluid channels to above the boiling point of water at normal atmospheric pressure;

(b) passing a flow of cooling water from a cooling water supply tank through the fluid channels in the high temperature injection mold for a limited duration during a molding cycle and at an elevated pressure level such that the cooling water remains in a liquid state while passing through the fluid channels to thereby reduce the temperature of the injection mold;

(c) mixing used high temperature cooling water emerging from the fluid channels of the high temperature injection mold with cooling water from the cooling water supply tank; and (d) returning the mixed cooling water to the cooling water supply tank.

2. The method of claim 1 wherein the step of mixing used high temperature cooling water and cooling water from the cooling water supply tank includes the steps of:

(a) providing a mixing chamber;

(b) admitting used high temperature cooling water emerging from the fluid channels into the mixing chamber to thereby cause the temperature of the mixing chamber to rise;

(c) admitting cooling water from the cooling water supply tank into the mixing chamber in response to the rise in temperature of the mixing chamber to thereby mix the cooling water from the cooling water supply tank with the used high temperature cooling water therein; and (d) releasing mixed cooling water from the mixing chamber.

3. A method for controlling the temperature of a fluid cooled high temperature injection mold having fluid channels formed therein, comprising the steps of:
  (a) injecting a molten material into the mold to thereby raise the temperature of the mold at the fluid channels to above the boiling point of water at normal atmospheric pressure;
  (b) passing a flow of cooling water through the fluid channels in the high temperature injection mold for a limited duration during a molding cycle and at an elevated pressure level such that the cooling water remains in a liquid state while passing through the fluid channels to thereby reduce the temperature of the injection mold; and
  mixing used high temperature cooling water emerging from the fluid channels of the high temperature injection mold with lower temperature cooling water including the steps of:
  (c) providing a mixing chamber;
  (d) admitting used high temperature cooling water emerging from the fluid channels of the high temperature injection mold into the mixing chamber to thereby cause the temperature of the mixing chamber to rise;
  (e) admitting lower temperature cooling water into the mixing chamber in response to the rise in temperature of the mixing chamber to thereby mix the lower temperature cooling water with the used high temperature cooling water therein; and
  (f) releasing mixed cooling water from the mixing chamber.

4. The method of claim 3 comprising the additional step of draining the mixed cooling water released from the mixing chamber.

5. A method for controlling the temperature of a fluid cooled high temperature injection mold having fluid channels formed therein, comprising the steps of:
  (a) injecting a molten material into the mold to thereby raise the temperature of the mold to above the boiling point of water at normal atmospheric pressure;
  (b) passing a flow of cooling water from a cooling water supply tank through the fluid channels in the high temperature injection mold for a limited duration during a molding cycle and at a pressure level such that the cooling water enters the fluid channels in a liquid state and transitions to a vapor state within the fluid channels to thereby reduce the temperature of the injection mold;
  (c) mixing used high temperature cooling water emerging from the fluid channels of the high temperature injection mold with cooling water from the cooling water supply tank; and
  (d) returning the mixed cooling water to the cooling water supply tank.

6. The method of claim 5 comprising the additional steps of:
  (a) treating the cooling water to remove contaminants therefrom; and
  (b) storing the treated cooling water in the cooling water supply tank.

7. The method of claim 5 wherein the step of mixing used high temperature cooling water and cooling water from the cooling water supply tank includes the steps of:
  (a) providing a mixing chamber;
  (b) admitting used high temperature cooling water emerging from the fluid channels into the mixing chamber to thereby cause the temperature of the mixing chamber to rise;
  (c) admitting cooling water from the cooling water supply tank into the mixing chamber in response to the rise in temperature of the mixing chamber to thereby mix the cooling water from the cooling water supply tank with the used high temperature cooling water therein; and
  (d) releasing mixed cooling water from the mixing chamber.

8. The method of claim 5 comprising the additional step of maintaining a temperature of the cooling water in the cooling water supply tank at a desired temperature level.

9. The method of claim 5 wherein cooling water from the cooling water supply tank is used for controlling the temperature of a plurality of high temperature injection molds.

10. The method of claim 5 wherein the step of passing a flow of cooling water through the fluid channels in the high temperature injection mold for a limited duration during a molding cycle includes the steps of:
  (a) sensing a temperature of the high temperature injection mold;
  (b) passing the flow of cooling water through the fluid channels in the high temperature injection mold when the sensed temperature of the high temperature injection mold exceeds a first temperature level; and
  (c) terminating the flow of cooling water through the fluid channels in the high temperature injection mold when the sensed temperature of the high temperature injection mold is reduced below a second temperature level.

11. The method of claim 5 wherein the step of passing a flow of cooling water through the fluid channels in the high temperature injection mold for a limited duration during a molding cycle includes the steps of:
  (a) beginning passing the flow of cooling water through the fluid channels in the high temperature injection mold at a pre-selected first point in time in the molding cycle; and
  (b) terminating the flow of cooling water through the fluid channels in the high temperature injection mold at a second point in time in the molding cycle.

12. The method of claim 5 wherein the step of passing a flow of cooling water through the fluid channels in the high temperature injection mold for a limited duration during a molding cycle includes the steps of:
  (a) beginning passing the flow of cooling water through the fluid channels in the high temperature injection mold at a first point in time in the molding cycle;
  (b) measuring the flow of cooling water through the fluid channels in the high temperature injection mold; and
  (c) terminating the flow of cooling water through the fluid channels in the high temperature injection mold after a selected measured amount of cooling water has flowed through the fluid channels in the high temperature injection mold.

13. A method for controlling the temperature of a fluid cooled injection mold having first and second mold parts, wherein the first and second mold parts have fluid channels formed therein, comprising the step of:
  passing a flow of cooling water from a supply of low temperature cooling water through the fluid channels in a one of the first and second mold parts for a limited duration during a first portion of a molding cycle while simultaneously passing a flow of heating water from a supply of high temperature heating water through the fluid channels in an other of the first and second mold parts for a limited duration during the first portion of the molding cycle.

14. The method of claim 13 comprising the additional steps of:
 (a) passing a flow of heating water from the supply of high temperature heating water through the fluid channels in the first and second mold parts for a limited duration during a second portion of the molding cycle; and
 (b) passing a flow of cooling water from the supply of low temperature cooling water through the fluid channels in the first and second mold parts for a limited duration during a third portion of the molding cycle.

15. The method of claim 13 comprising the additional step of passing a flow of cooling water from the supply of low temperature cooling water through selected ones of the fluid channels in a one of the first and second mold parts for a limited duration during a second portion of the molding cycle while simultaneously passing a flow of heating water from the supply of high temperature heating water through selected others of the fluid channels in the one of the first and second mold parts for a limited duration during the second portion of the molding cycle.

16. The method of claim 13 comprising additionally the steps of injecting a molten material into the mold to thereby raise the temperature of the mold to above the boiling point of water at normal atmospheric pressure and pressurizing the cooling water from the supply of low temperature cooling water to an elevated pressure level such that the cooling water remains in a liquid state while passing through the fluid channels.

17. The method of claim 13 comprising additionally the steps of injecting a molten material into the mold to thereby raise the temperature of the mold to above the boiling point of water at normal atmospheric pressure and pumping cooling water from the supply of low temperature cooling water at a low pressure level such that the cooling water enters the fluid channels in a liquid state and transitions to a vapor state within the fluid channels.

18. The method of claim 13 wherein the step of passing a flow of cooling water from the supply of low temperature cooling water through the fluid channels in a one of the first and second mold parts for a limited duration during a first portion of the molding cycle includes the step of passing limited duration pulses of cooling water from the supply of low temperature cooling water through the fluid channels.

* * * * *